(12) United States Patent
Otoshi et al.

(10) Patent No.: US 9,846,668 B2
(45) Date of Patent: Dec. 19, 2017

(54) BUS CONTROLLER, DATA FORWARDING SYSTEM, AND METHOD FOR CONTROLLING BUSES

(71) Applicant: FUJITSU LIMITED, Kawasaki-shi, Kanagawa (JP)

(72) Inventors: Akiko Otoshi, Kawasaki (JP); Toshihisa Anbai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 305 days.

(21) Appl. No.: 14/730,295

(22) Filed: Jun. 4, 2015

(65) Prior Publication Data

US 2016/0004659 A1  Jan. 7, 2016

(30) Foreign Application Priority Data

Jul. 7, 2014  (JP) .................... 2014-139743

(51) Int. Cl.
*H05K 7/10* (2006.01)
*G06F 13/40* (2006.01)
*G06F 13/16* (2006.01)
*G06F 13/364* (2006.01)
*G06F 13/42* (2006.01)

(52) U.S. Cl.
CPC ...... *G06F 13/4022* (2013.01); *G06F 13/1642* (2013.01); *G06F 13/1673* (2013.01); *G06F 13/364* (2013.01); *G06F 13/4282* (2013.01)

(58) Field of Classification Search
CPC ............. G06F 13/4022; G06F 13/1642; G06F 13/1673; G06F 13/4282
USPC ....................................................... 710/301
See application file for complete search history.

(56) References Cited

U.S. PATENT DOCUMENTS 4,985,886 A * 1/1991 Yomogida ............. H04L 12/437 370/276
6,101,565 A * 8/2000 Nishtala .............. G06F 13/4018 710/307
7,015,825 B2 * 3/2006 Callahan ................... G09F 9/33 340/815.45

(Continued)

FOREIGN PATENT DOCUMENTS

| JP | 2006-011926 | 1/2006 |
|----|-------------|--------|
| JP | 2010-128909 | 6/2010 |
| JP | 2013-175128 | 9/2013 |

*Primary Examiner* — Paul R Myers
(74) *Attorney, Agent, or Firm* — Fujitsu Patent Center

(57) ABSTRACT

The first buffers forward data from the first device to the respective corresponding second devices through the respective buses while the second buffers forward data from the respective corresponding second devices to the first device through the respective buses. In response to a simultaneous data transmission request to simultaneously transmit data from the first device to the second devices, the switch controller switches the first buffer into a data-forwarding enable state, and switches the second buffer into a data-forwarding disable state, for simultaneous data transmission from the first device to the plurality of second devices. The pseudo-response generator generates pseudo-response signals acting as a plurality of response signals that the second devices transmit to the first device as a result of the simultaneous data transmission, and transmits the plurality of the pseudo-response signals to the first device. This configuration achieves simultaneous access to multiple devices.

20 Claims, 19 Drawing Sheets

(56) References Cited

U.S. PATENT DOCUMENTS

| | | | |
|---|---|---|---|
| 2003/0043790 A1* | 3/2003 | Gutierrez | G06F 17/5045 370/362 |
| 2004/0010520 A1* | 1/2004 | Tsang | G06F 17/30873 |
| 2011/0044338 A1* | 2/2011 | Stahl | H04L 1/1607 370/392 |
| 2012/0069135 A1* | 3/2012 | Cipolli | H04L 1/1607 348/14.08 |
| 2012/0246510 A1* | 9/2012 | Kojina | G06F 13/4282 714/4.5 |
| 2013/0195044 A1* | 8/2013 | Pelletier | H04W 72/04 370/329 |
| 2013/0304990 A1* | 11/2013 | Bass | G06F 12/0835 711/118 |
| 2014/0149615 A1* | 5/2014 | Fosse | G06F 13/4291 710/110 |
| 2014/0281275 A1* | 9/2014 | Kruckemyer | G06F 12/0833 711/146 |
| 2014/0289552 A1* | 9/2014 | Araki | G06F 11/079 714/4.11 |

* cited by examiner

FIG. 3

| ACK_EN | 0 | 1 |
|---|---|---|
| SDA | ACK generation | Pass through |

FIG. 9

TABLE OF ASSOCIATION BETWEEN SETTING VALUES
AND ACTIVATED BUS WHEN SIMULTANEOUS WRITING AND SIMULTANEOUS RETRYING

| I/O 0.0 | I/O 0.1 | I/O 0.2 | I/O 0.3 | I/O 0.4 | I/O 0.5 | I/O 0.6 | I/O 0.7 |
|---|---|---|---|---|---|---|---|
| 0 (enable) | 0 (enable) | 1 (disable) | 0 (enable) | 1 (disable) | 0 (enable) | 1 (disable) | Don't care |
| ACK generation | SD#1 M⇒S | SD#1 S⇒M | SD#2 M⇒S | SD#2 S⇒M | SD#3 M⇒S | SD#3 S⇒M | UNUSED |

FIG. 12

| TABLE OF ASSOCIATION BETWEEN SETTING VALUES AND ACTIVATED BUS WHEN INDIVIDUAL RETRYING | | | | | | | | |
|---|---|---|---|---|---|---|---|---|
| | I/O 0.0 | I/O 0.1 | I/O 0.2 | I/O 0.3 | I/O 0.4 | I/O 0.5 | I/O 0.6 | I/O 0.7 |
| | 0 (enable) | 1 (disable) | 1 (disable) | 0 (enable) | 1 (disable) | 1 (disable) | 1 (disable) | Don't care |
| | ACK generation | SD#1 M⇒S | SD#1 S⇒M | SD#2 M⇒S | SD#2 S⇒M | SD#3 M⇒S | SD#3 S⇒M | UNUSED |

FIG. 15

TABLE OF ASSOCIATION BETWEEN SETTING VALUES AND ACTIVATED BUS WHEN INDIVIDUAL RETRYING

| I/O 0.0 | I/O 0.1 | I/O 0.2 | I/O 0.3 | I/O 0.4 | I/O 0.5 | I/O 0.6 | I/O 0.7 |
|---|---|---|---|---|---|---|---|
| 1 (disable) | 0 (enable) | 0 (enable) | 1 (disable) | 1 (disable) | 1 (disable) | 1 (disable) | Don't care |
| Pass through | SD#1 M⇒S | SD#1 S⇒M | SD#2 M⇒S | SD#2 S⇒M | SD#3 M⇒S | SD#3 S⇒M | UNUSED |

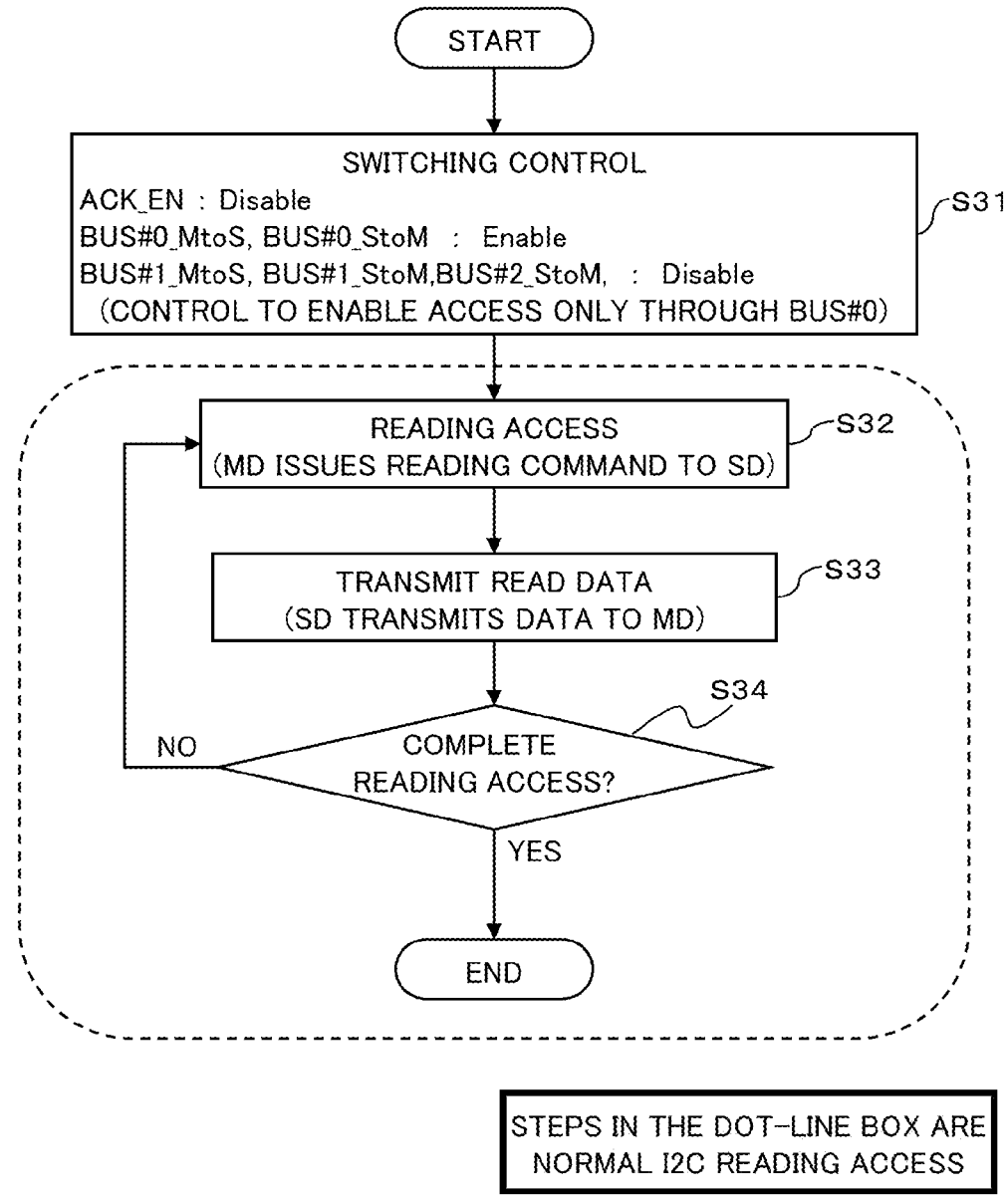

BUS CONTROLLER, DATA FORWARDING SYSTEM, AND METHOD FOR CONTROLLING BUSES

CROSS-REFERENCE TO RELATED APPLICATION

This application is based upon and claims the benefit of priority of the prior Japanese Application No. 2014-139743 filed on Jul. 7, 2014 in Japan, the entire contents of which are hereby incorporated by reference.

FIELD

The embodiments discussed herein are related to a bus controller, a data forwarding system, and a method for controlling buses.

BACKGROUND

Various communication schemes have been proposed for data exchange among multiple devices. In particular, the Inter-Integrated Circuit (I2C) communication that transmits data via a serial interface is sometimes applied to communication between devices disposed near to each other, such as on the same board.

In the I2C communication, a normal I2C bus that connects the devices to each other is formed of two signal lines, a serial data (SDA) signal line and a serial clock (SCL) signal line.

The devices connected to an I2C bus are classified into either a master device or a slave device and normally, each has unique I2C address set therefor.

As illustrated in accompanying drawings of FIGS. 17A and 17B, a single master device (I2C Maser) 100 is connected to multiple (three in the drawings) slave devices (I2C Slaves) 200 via one set of I2C buses 300.

FIGS. 17A and 17B illustrate a typical I2C tree structure and a typical I2C communication procedure. The following description specifies the respective slave devices with the reference numbers 200-1, 200-2, and 200-3, but refers to a non-specified slave device with the reference number 200.

In the example of FIGS. 17A and 17B, I2C slave addresses (I2C addresses) 0xA0, 0xA1, and 0xA2 are set for the slave devices 200-1, 200-2, and 200-3, respectively.

The master device 100 designates a slave device 200 that is to be the communication counterpart using the corresponding I2C slave address and then serially forwards data to and from the designated slave device 200. The I2C communication uses open-drain signal lines to connect devices, so that a set of I2C buses 300 is capable of connecting a single master device 100 to two or more slave devices 200.

According to the specification of the I2C communication, the master device 100 makes one-to-one access to a slave device 200. Upon receipt of a command from the master device 100, the slave device 200 recognizes that the master device 100 is making access to the slave device 200 itself and then occupies the I2C bus 300 until the slave device 200 replies to the master device 100 with a response signal (acknowledgement (ACK)).

For example, when the master device 100 is to write data into a register of the slave device 200-3, the master device 100 outputs data to the I2C bus 300 as illustrated in FIG. 17A. Specifically, the master device 100 serially outputs the address (0xA2) of the slave device 200-3, a writing command (Write), a register address (Reg. add), and data to be written (not illustrated) to the I2C bus 300 (SDA signal line). Upon receipt of these pieces of data, the slave device 200-3 recognizes that the address 0xA2 represents an access to the device 200-3 itself and occupies the I2C bus 300 until the slave device 200-3 completes the data writing of the designated register and replies to the master device 100 with an ACK. FIG. 17B illustrates an example of the master device 100 writing data into a register of the slave device 200-1. The master device 100 writes data into another slave device 200 except for the slave device 200-3 in the same manner as the above.

When the master device 100 accesses multiple slave devices 200 to write the same data in the slave devices 200, the process of FIG. 17A or 17B is serially repeated as illustrated in, for example, FIG. 18. FIG. 18 illustrates procedure (steps S101-S120) performed when a single master device (MD) makes a writing access (Write) into five slave devices (SD#1-SD#5).

As illustrated in FIG. 18, the MD first designates the address of the SD#1 and transmits a writing command including a writing access starting signal "H (High; 1)" to the SD#1 (step S101). The SD#1 recognizes the writing command directed to the SD#1 by referring to the address from the MD and then receives the writing command (step S102). After the completion of data writing in obedience to the writing command, the SD#1 transmits an ACK signal "L (Low; 0)" to the MD (step S103). After receiving the ACK signal from the SD#1 (step S104), the MD makes access to the SD#2 in the same manner (steps S105-S108) as the process performed on the SD#1. After that, the MD sequentially makes access to the SD#3 (steps S109-S112); access to the SD#4 (steps S113-S116); and access to the SD#5 (steps S116-S120).

As described above, when the MD is to write the same data into multiple SDs set respective unique addresses therefor, the MD serially repeats the same process multiple times as many as the number of SDs as illustrated in FIG. 18. For example, when the same initial value is to be set into each SD in the I2C communication at a start of a server device including a single MD and N (integer of two or more) SDs, the MD repeats the same process N times. The time that the MD takes to complete the writing data into the last SD from the start of data writing into the first SD increases in proportional to the number N of SDs. This process is very inefficient because increase in the number N of SDs prolongs the time that the starting of the server device (data forwarding process) takes.

In view of the above inefficiency, the I2C communication sets the same I2C address (e.g., 0xA2) for multiple SDs 200 as illustrated in FIG. 19, so that the master device 100 transmits data simultaneously to the multiple slave devices 200, that is, I2C multicasting. This allows the master device 100 to simultaneously make writing access to the multiple slave devices 200. However, ACKs from the respective SDs 200 collide with each other on the I2C bus 300, which may break data exchanged between the master device 100 and a slave device 200. Simply setting the same I2C address to the multiple slave devices 200 for simultaneous transmission hardly succeeds in correct simultaneous access to the multiple SDs 200.

SUMMARY

According to one aspect of the embodiments, there is provided a bus controller for controlling a plurality of buses each forwarding data between a first device and one of a plurality of second devices. The bus controller includes: a first buffer and a second buffer disposed on each bus, a switch controller, and a pseudo-response generator. The first buffer forwards data from the first device to the corresponding second device through the bus while the second buffer forwards data from the corresponding second device to the first device through the bus. The switch controller that, in response to a simultaneous data transmission request to simultaneously transmit data from the first device to the plurality of second devices, switches the first buffer into a data-forwarding enable state that allows data transmission from the first device to the corresponding second device, and switches the second buffer into a data-forwarding disable state that prohibits data transmission from the corresponding second device to the first device, for simultaneous data transmission from the first device to the plurality of the second devices. The pseudo-response generator that generates a plurality of pseudo-response signals acting as a plurality of response signals that the plurality of second devices transmit to the first device as a result of the simultaneous data transmission, and transmits the plurality of the pseudo-response signals to the first device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating control logic of an ACK generating circuit of FIG. 2;

FIG. 9 is a diagram illustrating an operation of a switch controller during simultaneous writing and simultaneous retrying of the second embodiment;

FIG. 12 is a diagram illustrating an operation of a switch controller during individual retrying of the second embodiment;

FIG. 15 is a diagram illustrating an operation of a switch controller during individual reading of the second embodiment;

FIG. 16 is a flow diagram illustrating an operation of individual reading of the second embodiment;

DESCRIPTION OF THE PREFERRED EMBODIMENTS

Figure 1:
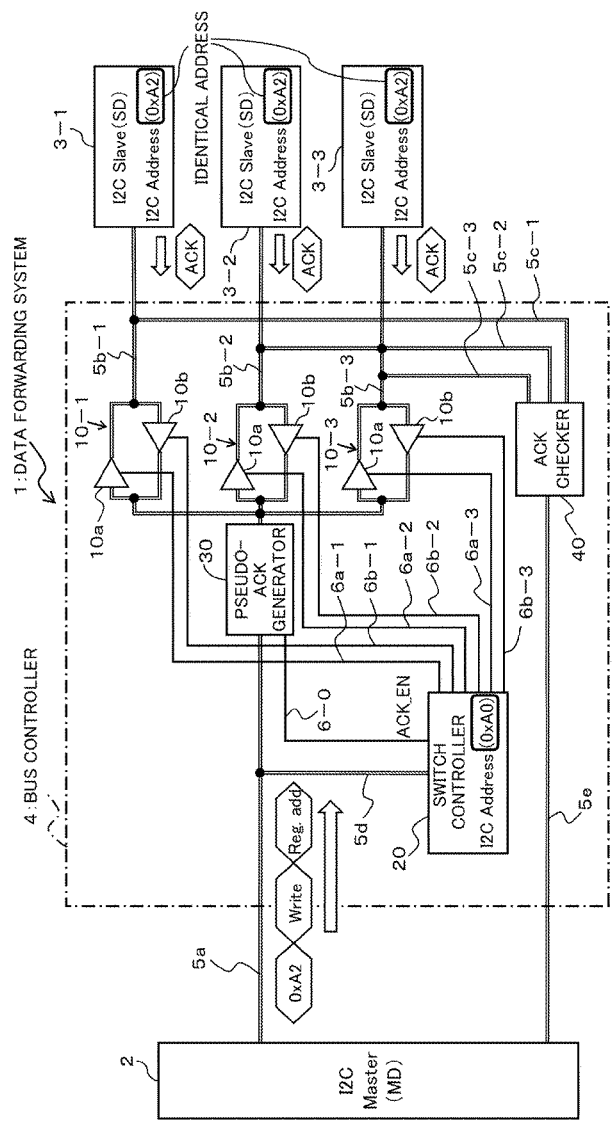
FIG. 1 is a block diagram schematically illustrating the configuration of a data forwarding system including a bus controller according to a first embodiment.

Hereinafter, description will now be made in relation to a bus controller, a data forwarding system, and a method for controlling buses with reference to accompanying drawings. However, the embodiment and the modifications thereof that are to be detailed below are merely examples and do not intend to exclude another modification and application of techniques that are not referred in this description. In other words, various changes and modification can be suggested without departing from the gist of the embodiment. For example, the embodiment and the modifications can be combined. The accompanying drawings may include other elements and devices functions in addition to those in the drawings.

(1) First Embodiment:

(1-1) Configuration of the First Embodiment

First of all, description will now be made in relation to the configuration of a data forwarding system 1 including a bus controller 4 according to a first embodiment with reference to a block diagram FIG. 1.

The data forwarding system 1 includes a single master device (I2C Master, MD, first device) 2 and multiple (three in the drawing) slave devices (I2C Slaves, SDs, second devices) 3. The devices 2 and 3 collectively form an apparatus, such as a server. Hereinafter, reference numbers 3-1, 3-2, and 3-3 are used for specifying one of the three slave devices, but an arbitrary slave device is represented by reference number 3.

The MD 2 is connected to each SD 3 via I2C buses 5a and 5b so that the MD 2 sets the initial value in the SDs 3 according to the I2C communication when the apparatus exemplified by a server is starting. Here, the MD 2 is connected to the I2C bus 5a, which branches into the three I2C buses 5b-1, 5b-2, and 5b-3 connected to three SDs 3-1, 3-2, and 3-3, respectively. Hereinafter, reference numbers 5b-1, 5b-2, and 5b-3 are used for specifying one of the three I2C buses, but an arbitrary I2C bus is represented by reference number 5b.

The I2C buses 5a and 5b and I2C buses 5c-5e that are to be detailed below are each serial interface bus. Each of the buses 5a-5e is formed of two signal lines, an SDA signal line and an SCL signal line. In the first embodiment, the MD 2 sets the same I2C address (e.g., 0xA2) for the multiple SDs 3 so that I2C multicasting (simultaneous access) that the MD 2 transmits data simultaneously (generally) to the multiple SDs 3 is enabled.

Throughout the specification, "simultaneous access" and equivalent expression represent access from the MD 2 simultaneously to the multiple SDs 3, but does not mean bidirectional access between the MD 2 and an SD 3.

A bus controller 4 that controls the buses 5a and 5b is disposed on the buses 5a and 5b connecting the MD 2 and the multiple SDs 3. The bus controller 4 includes bidirectional buffers 10-1, 10-2, and 10-3, a switch controller 20, a pseudo-ACK generator 30, and an ACK checker 40.

The bidirectional buffers 10-1, 10-2, and 10-3 are provided for the SDs 3-1, 3-2, and 3-3, respectively and are disposed on the buses 5b-1, 5b-2, and 5b-3, respectively. Hereinafter, reference numbers 10-1, 10-2, and 10-3 are used for specifying one of the three bidirectional buffers, but an arbitrary bidirectional buffer is represented by reference number 10.

Each bidirectional buffer 10 includes a first buffer 10a and a second buffer 10b.

The first buffer 10a enables the corresponding bus 5b to carry out unidirectional data forwarding (access) from the MD 2 to the corresponding SD 3, and is exemplified by a three-state buffer. The first buffer (three-state buffer) 10a has a control input terminal, which is connected to the switch controller 20 through a control signal line 6a. The first buffer 10a is switched between an enable state and a disable state by a control signal from the switch controller 20. For example, when a control signal input into the first buffer 10a is "L (Low)", which is "0", the first buffer 10a is switched into an enable state in which data forwarding from the MD 2 to the corresponding SD 3 is permitted. On the other hand, when a control signal input into the first buffer 10a is "H (High)", which is 1, the first buffer 10a is switched into a disable state in which data forwarding from the MD 2 to the corresponding SD 3 is prohibited.

The second buffer 10b enables the corresponding bus 5b to carry out reverse-direction data forwarding (access) from the corresponding SD 3 to the MD 2, and is exemplified by a three-state buffer. The second buffer (three-state buffer) 10b has a control input terminal, which is connected to the switch controller 20 through a control signal line 6b. The second buffer 10b is switched between an enable state and a disable state by a control signal from the switch controller 20. For example, when a control signal input into the second buffer 10b is "L", which is "0", the second buffer 10b is switched into an enable state in which data forwarding from the corresponding SD 3 to the MD 2 is permitted. On the other hand, when a control signal input into the second buffer 10b is "H", which is 1, the second buffer 10b is switched into a disable state in which data forwarding from the corresponding SD 3 to the MD 2 is prohibited.

Here, the control input terminals of the buffers 10a and 10b of the bidirectional buffer 10-1 are connected to the switch controller 20 via control signal lines 6a-1 and 6b-1, respectively; the control input terminals of the buffers 10a and 10b of the bidirectional buffer 10-2 are connected to the switch controller 20 via control signal lines 6a-2 and 6b-2, respectively; and the control input terminals of the buffers 10a and 10b of the bidirectional buffer 10-3 are connected to the switch controller 20 via control signal lines 6a-3 and 6b-3, respectively. Hereinafter, reference numbers 6a-1, 6b-1, 6a-2, 6b-2, 6a-3, and 6b-3 are used for specifying one of the control signal lines, but an arbitrary control single is represented by reference number 6a or 6b.

The switch controller 20 is connected to the MD 2 through the I2C bus 5a and the I2C bus 5d that is branched from the I2C bus 5a, is controlled by the MD 2, and controls the states of the buffers 10a and 10b and the state of the pseudo-ACK generator 30. The switch controller 20 is the same type of device as the SDs 3, which are accessed by the MD 2, and is able to control the operation of the switch controller 20 by the I2C communications through the I2C buses 5a and 5d. A unique I2C address (e.g., 1xA0), which is different from the address (e.g., 0xA2) of the multiple SDs 3, is set for the switch controller 20. This address setting allows the MD 2 to avoid erroneous activation of the switch controller 20 as data writing into the SDs 3 and conversely avoid erroneous activation of the SDs 3 as controlling the switch controller 20. The functions of the switch controller 20 will be detailed below.

The pseudo-ACK generator (pseudo-response generator) 30 is disposed on the I2C bus 5a, generates pseudo-ACKs (pseudo-response signals) acting as ACKs that the respective SDs 3 transmits to the MD 2 in response to the simultaneous data transmission (I2C multicasting) from the MD 2 and, replies to the MD 2 with the pseudo-ACKs. The pseudo-ACK generator 30 includes a control input terminal (i.e., enable terminal of a pseudo-ACK generating circuit 31 to be detailed below, see FIG. 2), and the switch controller 20 is connected to the control input terminal through a control signal line 6-0.

Figure 3:
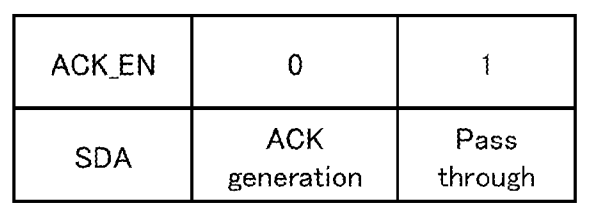

The pseudo-ACK generator 30 is switched between an enable state and a disable state by a control signal ACK_EN from the switch controller 20. As depicted in FIG. 3, when the control signal ACK_EN to the pseudo-ACK generator 30 is L (i.e., "0"), the pseudo-ACK generator 30 is switched into an enable state in which the pseudo-ACK generator 30 generates pseudo-ACKs (ACK generation) in this embodiment. In contrast, when the control signal ACK_EN to the pseudo-ACK generator 30 is H (i.e., "1"), the pseudo-ACK generator 30 is switched into a disable state in which the pseudo-ACK generator 30 passes the signal transmitting through the I2C bus 5a without processing the signal (Pass through). The configuration and the functions of the pseudo-ACK generator 30 will be detailed below by referring to FIGS. 2-4B.

The ACK checker 40 is connected to I2C buses 5c-1, 5c-2, and 5c-3, which are branched from the buses 5b-1, 5b-2, and 5b-3, respectively, and is connected to the MD 2 via an I2C bus 5e. Hereinafter, reference numbers 5c-1, 5c-2, and 5c-3 are used for specifying one of the three I2C buses, but an arbitrary I2C bus is represented by reference number 5c.

Figure 5:
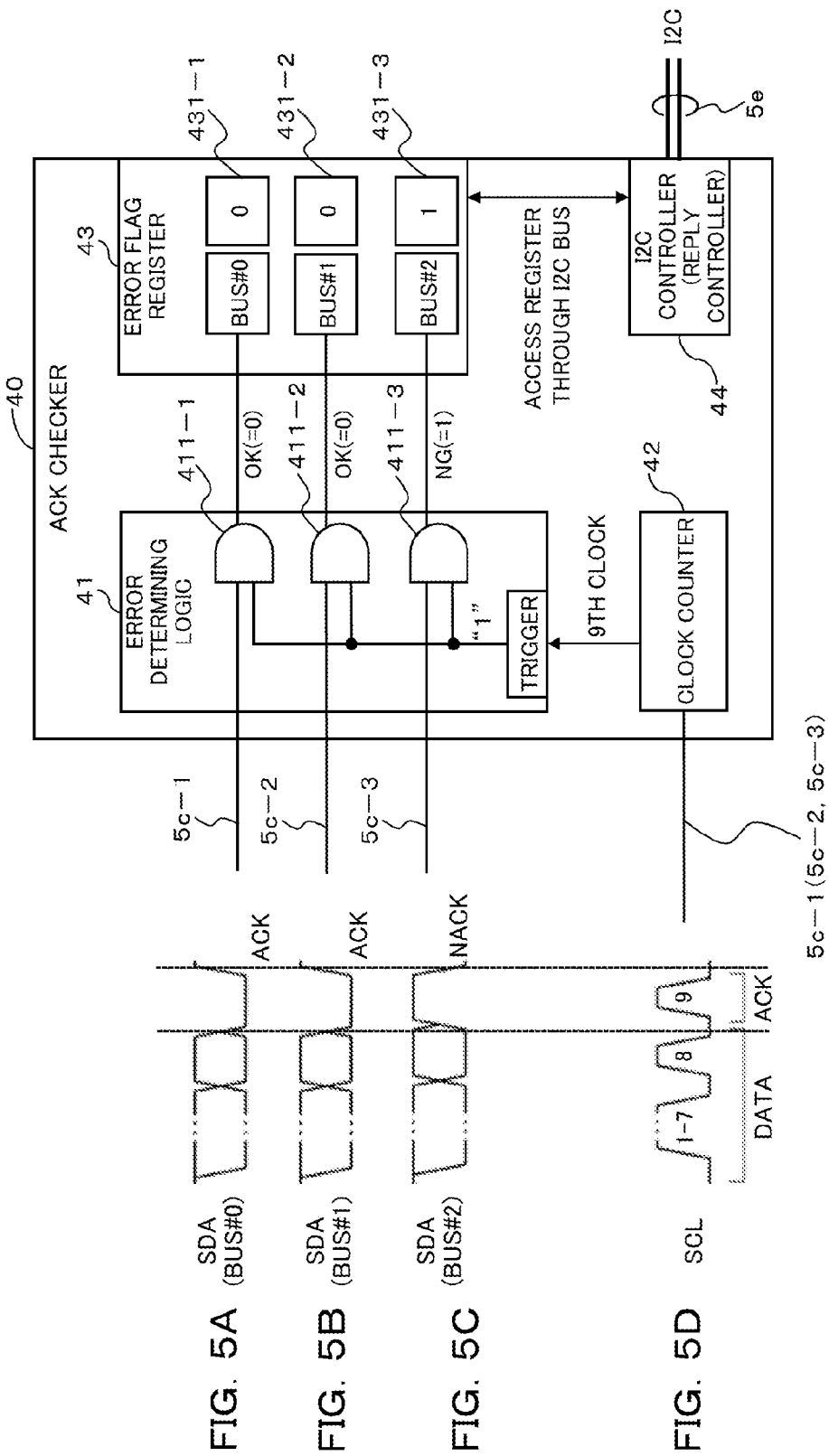
FIGS. 5A-5E are diagrams illustrating an ACK checker of FIG. 1, FIGS. 5A-5D being time charts depicting signals input into the ACK checker and FIG. 5E being a block diagram schematically illustrating the configuration and the function of the ACK checker.

The ACK checker 40 includes at least an error flag register 43 (see FIG. 5E), and an I2C controller 44 (see FIG. 5E). The error flag register 43 functions as a storing section that receives ACKs from the respective SDs 3 through the buses 5b and 5c and stores therein a state (0 or 1) of the received ACKs. The I2C controller 44 functions as a reply controller that, upon receipt of a state reply request from the MD 2 through the bus 5e, reads the states of ACKs from the error flag register 43 and then transmits the read ACKs to the MD 2. The configuration and the function of the ACK checker 40 will be detailed below by referring to FIGS. 5A-5E.

(1-2) Switch Controller (Enable Control)

Here, the switching function of the switch controller 20 will now be detailed in regard to the following (A1) to (A4). The switch controller 20 is controlled by the MD 2 through the buses 5a and 5d, and switches control signals to be input into the control input terminals of the three-state buffers 10a and 10b of each bidirectional buffer 10 between L(0) and H(1). This means that the switch controller 20 switches the respective buffers 10a and 10b between the data-forwarding enable state and the data-forwarding disable state. Similarly, the switch controller 20 is controlled by the MD 2 through the buses the 5a and 5d, and switches control signals ACK_EN to the pseudo-ACK generator 30 between L(0) and H(1). This means that the switch controller 20 switches the pseudo-ACK generator 30 between a state of generating pseudo-ACKs and a state of passing a signal transmitting through the I2C bus 5a.

(A1) When the MD 2 requests simultaneous data transmitting to the multiple SDs 3, which corresponds to simultaneous data writing request by using the I2C multicasting, the switch controller 20 switches the control signal ACK_EN to the pseudo-ACK generator 30 to L(0), so that the pseudo-ACK generator 30 is switched into a state of generating pseudo-ACKs. The switch controller 20 further switches the control signals for the first buffers 10a to L(0), so that the respective first buffers 10a are switched into the data-forwarding enable state while switches the control signals for the second buffers 10b to H(1), so that the second buffers 10b into the data-forwarding disable state. The detailed switching function will be described below by referring to FIG. 6 (first embodiment) and FIGS. 8-10 (second embodiment).

(A2) If the MD 2 requests simultaneous retrying (retransmission request) to all the SDs 3 under the state of at least one ACK transmitted from the I2C controller 44 of the ACK checker 40 indicates abnormality (1), the switch controller 20 carries out the same switch control as that in the above (A1). After the switch control, the MD 2 carries out simultaneous data transmitting to multiple SDs 3, that is, simultaneous wiring by using the I2C multicasting, so that the simultaneous retry is carried out.

(A3) If the MD 2 requests individual retrying to a SD 3 corresponding to a bus indicating abnormality under the state of at least one ACK transmitted from the I2C controller 44 of the ACK checker 40 indicates the abnormality (1), the switch controller 20 carries out the following switch control. Specifically, the switch controller 20 switches the control signal ACK_EN to the pseudo-ACK generator 30 to L(0), so that the pseudo-ACK generator 30 is switched to a state of generating pseudo-ACKs. The switch controller 20 specifies the SD 3 corresponding the abnormal bus and switches the control signal to the first buffer 10a to the specified SD 3 to L(0), so that the first buffer 10a corresponding to the specified SD 3 is switched into the data-forwarding enable state. In contrast, the switch controller 20 switches the control signals to the buffers 10a and 10b except for the first buffer 10a corresponding to the specified SD 3 to H(1), so that the remaining the buffers 10a and 10b are switched into the data-forwarding disable state. After the switch control, the MD 2 retries simultaneous data transmitting to the multiple SDs 3, which is simultaneous writing by using I2C multicasting so that individual retrying is accomplished. This detailed switching function will be described below by referring to FIGS. 11-13 (second embodiment).

(A4) If the MD 2 is to read data from a particular SD 3 among the multiple SDs 3, the switch controller 20 carries out the following switch control in response to a data reading request from the particular SD 3. Specifically, the switch controller 20 switches the control signal ACK_EN to the pseudo-ACK generator 30 to H(1), so that the pseudo-ACK generator 30 is switched into a state of passing the signal transmitting through the I2C bus 5a. The switch controller 20 further switches the control signals to the first buffer 10a and the second buffer 10b corresponding to the particular SD 3 to L(0), so that the first buffer 10a and the second buffer 10b are switched into a data-forwarding enable state. In contrast, the switch controller 20 further switches the control signals to the first buffers 10a and the second buffers 10b except for the first buffer 10a and the second buffer 10b corresponding to the particular SD 3 to H(1), so that the remaining buffers 10a and 10b are data-forwarding disable state. After the switch control, the MD 2 carries out simultaneous reading by using the I2C multicasting, and thereby individual reading from the particular SD 3 is accomplished. The detailed switching function will be described below by referring to FIGS. 14-16 (second embodiment).

The switching functions (A1) to (A4) of the switch controller 20 are achieved by the device of the same type as the SDs 3. Alternatively, the functions may be incorporated in MD 2 and may be accomplished by the MD 2.

Figure 2:
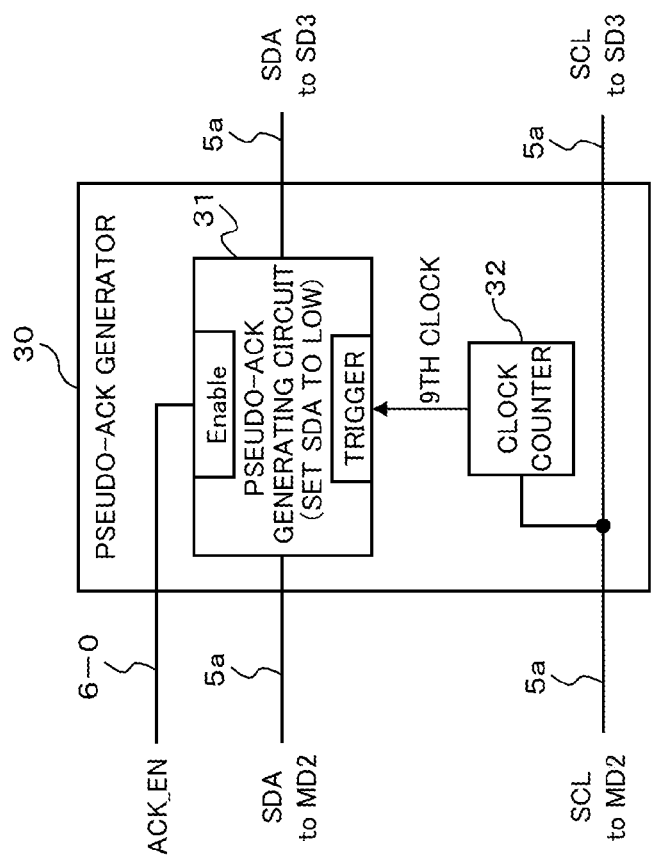
FIG. 2 is a block diagram schematically illustrating the configuration of an ACK generator of FIG. 1.
Figure 4:
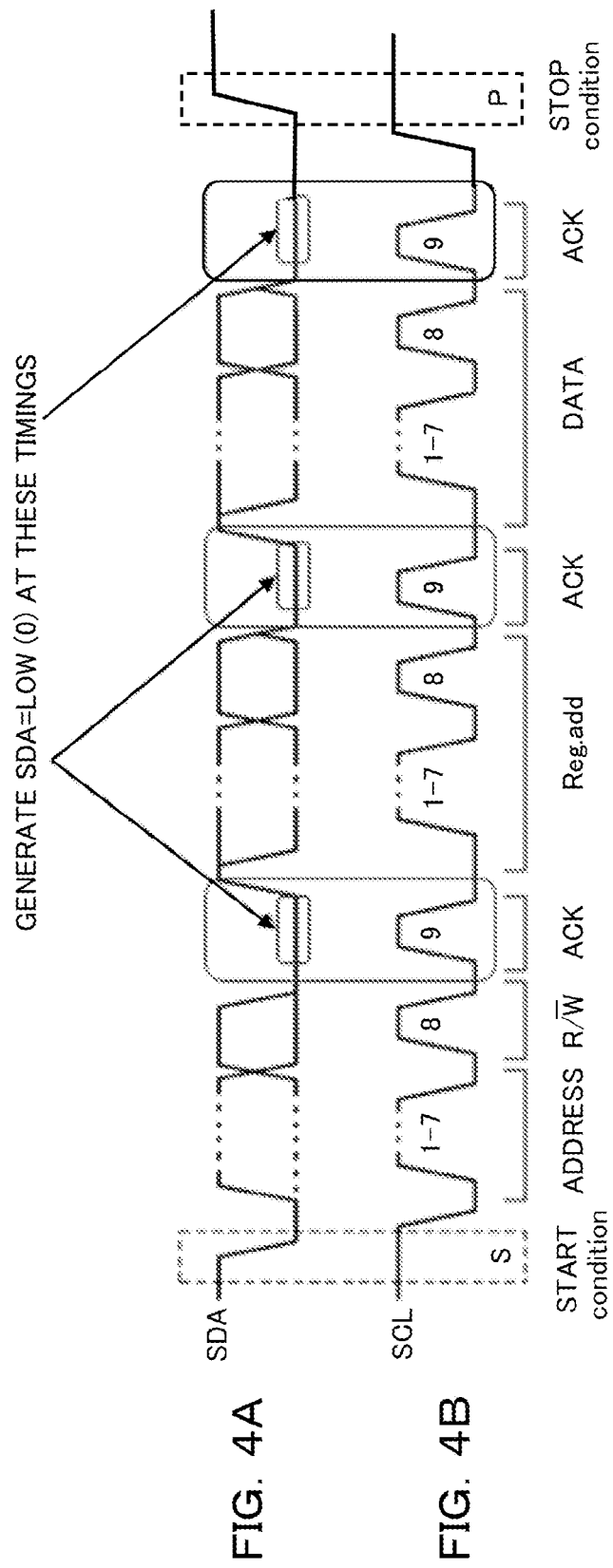
FIGS. 4A and 4B are timing charts denoting the function of an ACK generating circuit of FIG. 2.

(1-3) Pseudo-ACK Generator (ACK Generator):

Next, description will now be made in relation to the configuration and the functions of the pseudo-ACK generator 30 by referring to FIGS. 2-4B. FIG. 2 is a block diagram schematically illustrating the configuration of the pseudo-ACK generator 30; FIG. 3 is a diagram denoting the control logic of the pseudo-ACK generating circuit 31 illustrated in FIG. 2; and FIGS. 4A and 4B are timing charts depicting the function of the pseudo-ACK generator 30.

FIGS. 4A and 4B illustrate behavior of signals through a bus during typical I2C access. FIG. 4A illustrates signal behavior in, for example, SDA signal line of the I2C bus 5a while FIG. 4B illustrates signal behavior in, for example, the SCL signal line of the I2C bus 5a. When the states of an SDA signal and an SCL signal line satisfies START condition S, the MD 2 starts data transmission to the respective SDs 3. The data transmission is carried out in a unit of eight bits. After the MD 2 transmits the eight bit data, each SD 3 replies to the MD 2 with a response signal being the ninth-bit data to the transmission of the eight-bit data. The response signal in the L (Low) state is regarded as an ACK that indicates that the eight-bit data is normally received while the response signal in the H (High) state is regarded as a NACK that indicates that the eight bit data is not normally received.

Upon receipt of a response signal of an ACK, the MD 2 transmits the next command string or the next data string to the SD 3. In the SDA of FIG. 4A, seven bits of the first eight bits designate an address of a transmission-destination SD 3, and the remaining one bit of the first eight bits designates reading or writing. If the ninth bit is an ACK response to the first eight bits, the next eight bits designate the address of a register to be accessed in the transmission-destination SD 3. If the subsequent ninth bit is an ACK response to the address, the ensuing eight bits convey writing data or reading data. Then, if the ninth bit is an ACK response and the SDA signal and the SCL signal satisfy the STOP condition P, the MD 2 finishes the access to the SDs 3.

Figure 19:
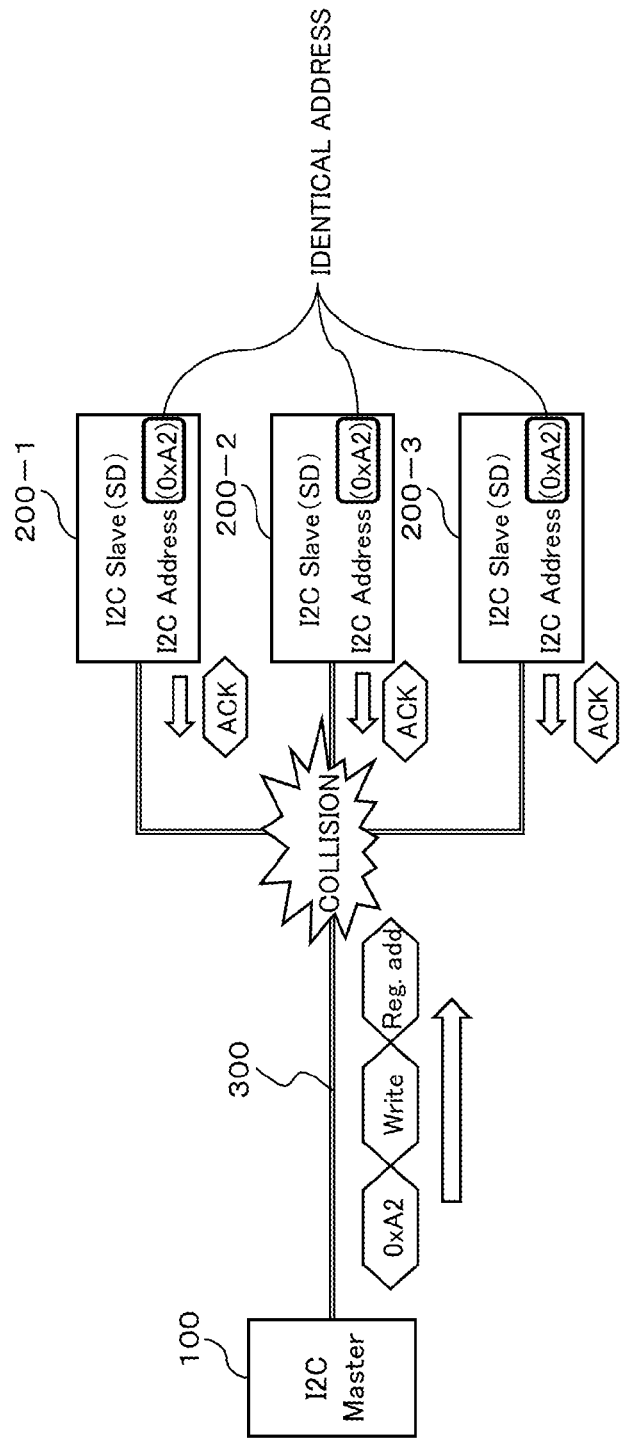
FIG. 19 is a diagram illustrating I2C multicasting.

In this embodiment, when the MD 2 is to carry out simultaneous writing, simultaneous retrying, and individual retrying, the second buffers 10b are switched into the data-forwarding disable state, which consequently prohibits the SDs 3 from sending actual ACKs (or NACKs) to the MD 2. This can avoid collision of response signals which occurs in the case of FIG. 19. However, prohibiting the respective SDs 3 from replying with ACK responses does not complete the access of the previous eight bits and does make it impossible to continue the subsequent access.

Considering the above inconvenience, the pseudo-ACK generator 30 switches the state of the ninth bit of the SDA into L (Low) as illustrated in FIG. 4A each time eight-bit data is transmitted and received between the MD 2 and each SD 3. This means that the pseudo-ACK generator 30 generates, on the I2C bus 5a, pseudo-ACKs from the SDs 3 to the MD 2 and replies the MD 2 with the generated pseudo-ACKs. In order to exert the function, the pseudo-ACK generator 30 is formed of a Complex Programmable Logic Device (CPLD) and a Field Programmable Gate Array (FPGA) and, as illustrated in FIG. 2, has the functions as a pseudo-ACK generating circuit 31 and a clock counter 32.

The clock counter 32 is connected to the SCL signal line of the I2C bus 5a and counts the clock number passing through the SCL signal line after the start of data transmission, and outputs a trigger signal to the pseudo-ACK generating circuit 31 each time the clock counter 32 counts the ninth clock (i.e., clocks of multiples of nine).

The pseudo-ACK generating circuit 31 is disposed on the SDA signal line of the I2C bus 5a and has a trigger terminal and an enable terminal. As described above, a control signal ACK_EN is input into the enable terminal (control input terminal) from the switch controller 20 through the control line 6-0. As illustrated in FIG. 3, when the control signal ACK_EN is L(Low), the pseudo-ACK generating circuit 31 comes into the enable state and is switched into a state of generating a pseudo-ACK (ACK generation). Thereby, the function of generating a pseudo-ACK is activated. On the other hand, if the control signal ACK_EN is H (High), the pseudo-ACK generating circuit 31 comes into the disable state to deactivate the function of generating a pseudo-ACK, so that the pseudo-ACK generating circuit 31 is switched into a state of passing the signal transmitting through the I2C bus 5a without any processing (Pass through).

When a control signal ACK_EN in the L state is input into the pseudo-ACK generating circuit 31, which responsively activates the function of generating a pseudo-ACK, the pseudo-ACK generating circuit 31 switches the SDA signal lines on the I2C bus 5a into the L state at the timings illustrated in FIGS. 4A and 4B. This means that, the pseudo-ACK generating circuit 31 generates the pseudo-ACK that is regarded as response signals and outputs the generated pseudo-ACK to the SDA line of the I2C bus 5a. The timing of generating a pseudo-ACK (i.e., timings to switch the SDA into Low) is a timing at which a trigger signal from the clock counter 32 is input into the trigger terminal, which is a timing at which the clock counter 32 counts a clock of a multiple of nine after the start of data transmission.

(1-4) ACK Checker

Next, description will now be made in relation to the specific configuration and the function of the ACK checker 40 by referring to FIGS. 5A-5E. FIGS. 5A-5D are timing charts representing signals input into the ACK checker 40 and FIG. 5E is a block diagram schematically illustrating the configuration and the function of the ACK checker 40.

As described above, when performing simultaneous writing, simultaneous retrying, and individual retrying, the MD 2 of the first embodiment prohibits the respective SDs 3 from replying to the MD 2 with actual ACKs (or NACKs) by switching the respective second buffers 10b into the data-forwarding disable state. Although this avoid collision of response signal as occurred in FIG. 19, the MD 2 does not confirm whether each SD 3 has really succeeded in the writing access and the retrying access.

As a solution to the above, the ACK checker 40 has functions for storing the states of ACKs (or NACKs) that the respective SDs 3 reply and transmitting the stored states to the MD 2 in response to a state reply request from the MD 2. This allows the MD 2 to check the actual ACKs that the respective SDs 3 had replied. To achieve the functions, the ACK checker 40 is formed of a CPLD or an FPGA, and has, as illustrated in FIG. 5E, error determining logic 41, a clock counter 42, an error flag register 43, and an I2C controller 44.

As illustrated in FIG. 5D, the clock counter 42 is connected to the SCL signal line of the I2C bus 5c (one of the buses 5c-1, 5c-2, and 5c-3). Likewise the above clock counter 32, the clock counter 42 counts the clock number passing through the SCL signal line after the start of data transmission, and outputs a trigger signal (in the H(1) state) to the error determining logic 41 each time the clock counter 42 counts the ninth clock (clocks of multiples of nine).

The error determining logic 41 includes three AND gates 411-1, 411-2, and 411-3 corresponding to the three SDs 3-1, 3-2, and 3-3 (i.e., I2C buses 5c-1, 5c-2, and 5c-3), respectively. In the FIG. 5E, the I2C buses 5c-1, 5c-2, and 5c-3 are denoted to be BUS#0, BUS#1, and BUS#2, respectively; the ninth bits passing through the SDA lines are the response signals from the respective SDs 3. A response signal "0" represents an ACK while response signal "1" represents a NACK. Hereinafter, reference numbers 411-1, 411-2, and 411-3 are used for specifying one of the three AND gates, but an arbitrary AND gate is represented by reference number 411.

The AND gate 411-1 outputs a logical product of an SDA signal from the SD 3-1 illustrated in FIG. 5A and a trigger signal provided by the clock counter 42 every nine clocks. Likewise, the AND gate 411-2 outputs a logical product of an SDA signal from the SD 3-2 illustrated in FIG. 5B and a trigger signal provided by the clock counter 42 every nine clocks; and the AND gate 411-3 outputs a logical product of an SDA signal from the SD 3-3 illustrated in FIG. 5C and a trigger signal provided by the clock counter 42 every nine clocks.

At every nine clocks, the SDA signal serves as an ACK/NACK bit represents the states of ACKs of the respective SD 3. Specifically, the ACK/NACK bit taking a value of 0 ("Low" level) represents that the access result of the corresponding SD 3 is normal (OK) but the ACK/NACK bit taking a value of "1" ("High" level) represents that the access result of the corresponding SD 3 is abnormal (NG). The AND gate 411 outputs a logical product of a trigger signal in the "H" level and an ACK/NACK bit of the corresponding SDA signal at every nine bits. Thereby, the AND gate 411 outputs "0" (ACK) representing a normal state when the ACK/NACK bit takes a value "0" while outputs "1" (NACK) representing an abnormal state (error state) when the ACK/NACK bit takes a value "1".

The error flag register (storing section) 43 includes a BUS#0 bit 431-1, a BUS#1 bit 431-2, and a BUS#2 bit 431-3 corresponding to the three AND gates 411-1, 411-2, and 411-3, respectively. Hereinafter, reference numbers 431-1, 431-2, and 431-3 are used for specifying one of the three bits, but an arbitrary bit is represented by reference number 431.

The BUS#0 bit 431-1 holds the value "0" when the output of the AND gate 411-1 is "0", which means that the access result of the SD 3-1 is normal. On the other hand, the BUS#0 bit 431-1 holds the value "1" when the output of the AND gate 411-1 is "1", which means that the access result of the SD 3-1 is abnormal.

The BUS#1 bit 431-2 holds the value "0" when the output of the AND gate 411-2 is "0", which means that the access result of the SD 3-2 is normal. On the other hand, the BUS#1 bit 431-2 holds the value "1" when the output of the AND gate 411-2 is "1", which means that the access result of the SD 3-2 is abnormal.

Similarly, the BUS#2 bit 431-3 holds the value "0" when the output of the AND gate 411-3 is "0", which means that the access result of the SD 3-3 is normal. On the other hand, the BUS#2 bit 431-3 holds the value "1" when the output of the AND gate 411-3 is "1", which means that the access result of the SD 3-3 is abnormal.

As described above, upon receipt of a state reply request from the MD 2 through the bus 5e, the I2C controller (reply controller) 44 reads the values ("0" when a normal state, while "1" when an abnormal state) stored in respective bits 431 from the error flag register 43 in response to the state reply request. Specifically, upon receipt of the request, the I2C controller 44 reads the values of the respective bits 431 by accessing the error flag register 43 through the I2C bus, and if the read value indicates abnormality (the value "1"), the I2C controller 44 replies to the MD 2 with the abnormality through the I2C bus 5e. If one of the bits 431 holds the value "1" representing abnormality, the I2C controller 44 sends the MD 2 identifying information that identifies the bus 5c (i.e., the SD 3 connected to the bus 5c) corresponding to the abnormality.

FIGS. 5A-5E illustrate an example in which the access result of the SD 3-3 is abnormal and the ninth bit of the SDA signal of the I2C bus 5c-3 is in the H state. In this case, in response to a trigger signal of the clock counter 42 rising at the ninth clock of the SCL, the output of the AND gate 411-3 comes to "1", which indicates NG and the value "1" is stored in the BUS#2 bit 431-3. The MD 2 can recognize the abnormality of the access result of the SD 3-3 by referring to the error flag register 43 via the I2C bus 5e and the I2C controller 44. On the basis of the recognition, the MD 2 executes the above simultaneous retrying or individual retrying.

(1-5) Operation in the First Embodiment:

Next, description will now be made in relation to the operation of the bus controller 4 having the above configuration and function by referring to FIGS. 1-6. FIGS. 1-6 illustrate a state where the data forwarding system 1 is carrying out simultaneous writing by means of I2C multicasting (simultaneous data transmission).

FIG. 1 illustrates the configuration that allows the MD 2 to simultaneously access multiple SDs 3. As illustrated in FIG. 1, the bidirectional buffers 10, the switch controller 20, the pseudo-ACK generator 30, and the ACK checker 40 are interposed between the MD 2 and the multiple SDs 3.

As described above with reference to FIG. 19, the same I2C address (e.g., 0xA2) are set for the multiple SDs 3 so that the MD 2 simultaneously accesses the multiple SDs 3. This address setting enables the MD 2 to simultaneous access the multiple SDs 3 (i.e., I2C multicasting). However, this causes collision of responses from the multiple SDs 3 with each other as described with reference to FIG. 19.

Figure 6:
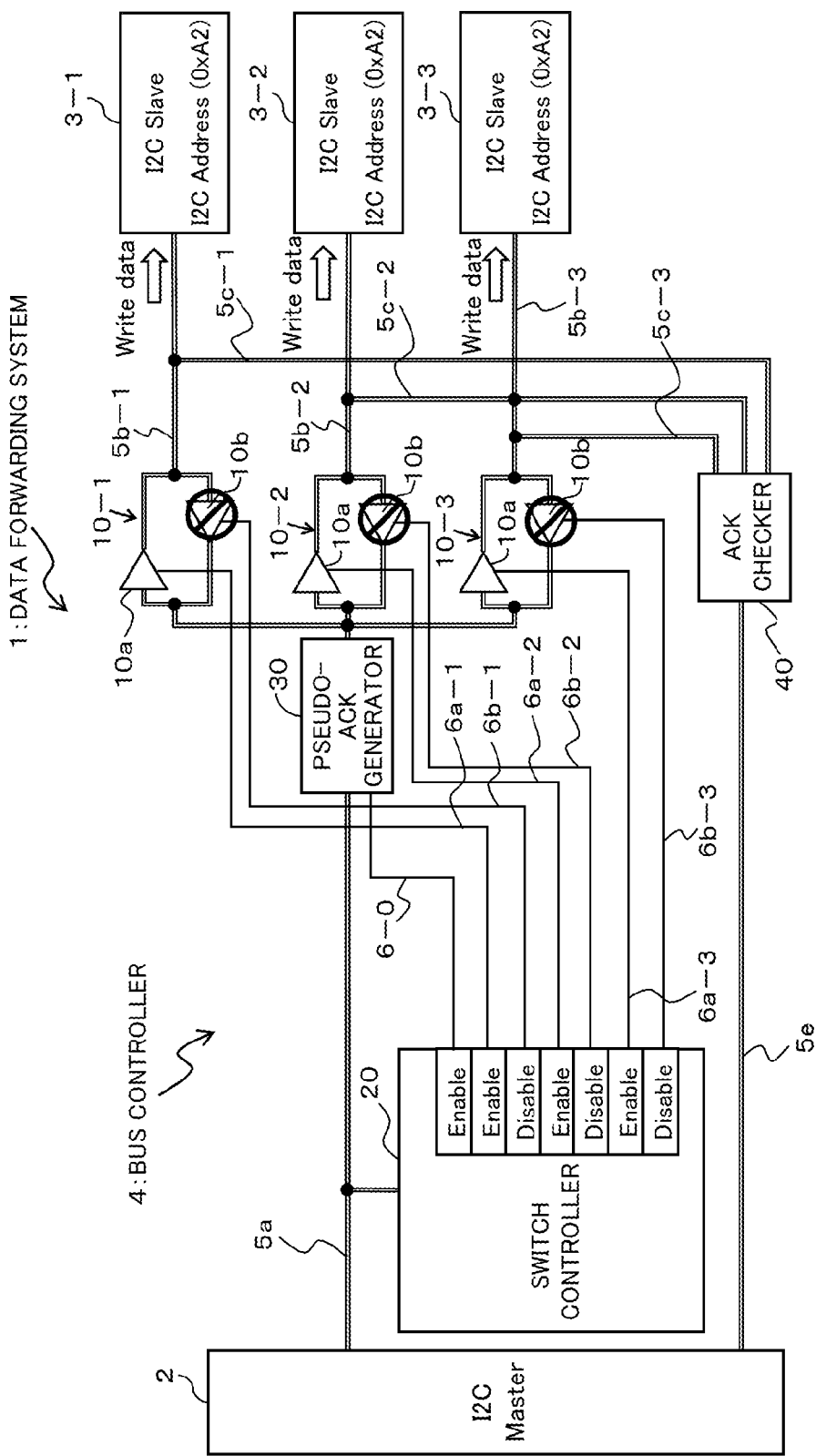
FIG. 6 is a diagram illustrating a state when a data forwarding system of FIG. 1 is performing simultaneous writing operation by means of I2C multicasting.

To avoid such a collision of responses, each bidirectional buffer 10 includes two three-state buffers of the first buffer 10a and the second buffer 10b. The first buffer 10a and the second buffer 10b are each switched between the enable state and the disable state by the switch controller 20. For this purpose, the first buffer 10a is switched into the enable state while the second buffer 10b is switched into the disable state, as illustrated in FIG. 6. Thereby, the bidirectional buffers 10 allow access from the MD 2 to the respective SDs 3, but prohibits data transmission from the respective SDs 3 to the MD 2. This can avoid collision of responses from the multiple SDs 3, so that inconvenience, such as braking data to be communicated between the MD 2 and a SD 3, can be prevented.

Switching the second buffers 10b from the respective SDs 3 to the MD 2 into the disable state causes the responses (ACKs) from the respective SDs 3 to the MD 2 to not reach the MD 2. The access is never completed unless the ACKs reach the MD 2. As described above with reference to FIGS. 2-4B, the inconvenience is solved by generating pseudo-ACKs in the bus controller 4 by the pseudo-ACK generator 30 and replies to the MD 2 with the pseudo-ACKs as illustrated in FIG. 6. This causes the MD 2 to surely complete the access (e.g., a writing command process on the SDs 3).

Besides, to allow access to one (particular SD 3) among the multiple SDs 3, the pseudo-ACK generator 30 of this embodiment is also switched between the enable state and the disable state by the switch controller 20. When the MD 2 is accessing only the particular SD 3, the pseudo-ACK generator 30 is switched into the disable state as detailed in above switching function (A4). At that time, only the buffers 10a and 10b corresponding to the particular SD 3 are switched into the data forwarding enable state and the buffers 10a and 10b of the remaining SDs 3 are switched into the data forwarding disable state. This allows the MD 2 to access only to such a particular SD 3 as performed in the traditional I2C communication through the I2C multicasting on the multiple SDs 3 for which the same I2C address is set.

As described in the above switching function (A1), in simultaneous writing, the first buffers 10a for the access from the MD 2 to the respective SDs 3 are switched to the enable state and thereby the access routes to all the SDs 3 are activated, so that the first buffers 10a are switched into the data-forwarding enable state. On the other hand, the second buffers 10b for the access from the respective SDs 3 to the MD 2 are switched into the disable state and thereby the access routes to the MD 2 are deactivated, so that the second buffers 10b are switched into the data-forwarding disable state. Under this state of the first and the second buffers 10a and 10b, when the MD 2 carries out access (i.e., command) to a particular address (e.g., 0xA2), all the SDs 3 recognize that the access is directed to the SDs 3 themselves and reply to the MD 2 with responses (ACKs). Although the replies to the MD 2 are intercepted, the pseudo-ACKs generated by the pseudo-ACK generator 30 are send to the MD 2 as illustrated in FIG. 6. Consequently, the MD 2 recognizes that the commands are executed and completes the command process.

In this embodiment, since pseudo-ACK generator 30 falsely generates ACKs, the MD 2, which even receives the pseudo-ACKs, does not confirm whether actual writing access (simultaneous writing) has succeeded. As a solution to this, the first embodiment prepares the ACK checker 40 described above by referring to FIGS. 5A-5E.

The ACK checker 40 monitors the behavior of the I2C buses 5c (SDA signal lines) connected to the respective SDs 3, and the MD 2 determines, by referring to the result of the monitoring by the ACK checker 40, whether access to each SD 3 has been normally completed. In other words, the ACK checker 40 monitors, each time ninth clocks are counted, whether or not the level of the SDA signal of the bus 5a corresponding to each SD 3 drops to Low, and thereby determines whether the SD 3 replies to the access from the MD 2 with an ACK. The ACK checker 40 makes the determination on all the SDs 3.

The ACK checker 40 stores the result of the determination, which specifically is whether the access to each SD 3 has been succeeded (i.e., the result of the access being normal or abnormal), into the error flag register 43. The MD 2 can recognize, by reading the information in the error flag register 43 through the I2C bus 5e and the I2C controller 44, which bus 5c has failed in the access, that is, which SD 3 has failed in the access. When the MD 2 recognizes a failure in the access, the MD 2 carries out simultaneous retrying using the above switching function (A2) or specifies the SD 3 that has failed in the access and carries out individual retrying on the specified SD 3 using the above switching function (A3).

In reading at least one setting value or the like of a particular SD 3, the MD 2 activates only the buffers 10*a* and 10*b* on the bus 5*b* corresponding to the particular SD 3 and also switches the function of the pseudo-ACK generator 30 into the disable state using the above switching function (A4). In this embodiment, since an identical I2C address is used by the multiple SDs 3, the MD 2 does not access each individual SD 3 by using the address. However, the individual access to a particular SD 3 can be accomplished by activating only the access route (the bidirectional buffer 10) corresponding to the particular SD 3, as described the above. The data read through such individual access passes through the pseudo-ACK generator 30 being in the disable state and reaches the MD 2.

(1-6) Effects of First Embodiment:

In the bus controller 4 of the first embodiment having the configuration and the function described above, when the MD 2 is simultaneously transmitting data to the multiple SDs 3 set therein an identical address (i.e., I2C multicasting), the first buffers 10*a* enable data forwarding from the MD 2 to the multiple SDs 3. At the same time, the second buffers 10*b* disable data forwarding from the respective SDs 3 to the MD 2. This can avoid collision of responses from the multiple SDs 3, so that inconvenience, such as braking data to be communicated between the MD 2 and a SD 3, can be prevented.

Under this state, although responses (ACKs) from respective SDs 3 to the MD 2 do not reach MD 2, the pseudo-ACK generator 30 being in the enable state generates a pseudo-ACK, and replies to the MD 2 with the generated ACK. This allows the MD 2 to surely complete the corresponding command process, such as writing access to the SDs 3.

In the first embodiment, the ACK checker 40 holds information as to whether the result of access to each SD 3 is normal or abnormal. Consequently, the MD 2 reads this information through the I2C bus 5*e* and the I2C controller 44 and exactly recognizes which SD 3 has failed in the access by referring to the information, so that the MD 2 can retry the writing access on the SD 3 that has failed in the access.

Furthermore, when the MD 2 is reading setting values of a particular SD 3 in the first embodiment, only the buffer 10 on an access route to the particular SD 3 is activated, and thereby individual access to the particular SD 3 can be achieved. The data reading through such individual access passes through the pseudo-ACK generator 30 being in the disable state and reaches the MD 2.

As described above, the above embodiment allows the MD 2 to simultaneous access the multiple SDs 3 in writing access while allows the MD 2 to individually access a particular SD 3 in reading access. This can greatly reduce the time for writing access to multiple SDs 3, without impairing the function of the normal I2C access.

Figure 18:
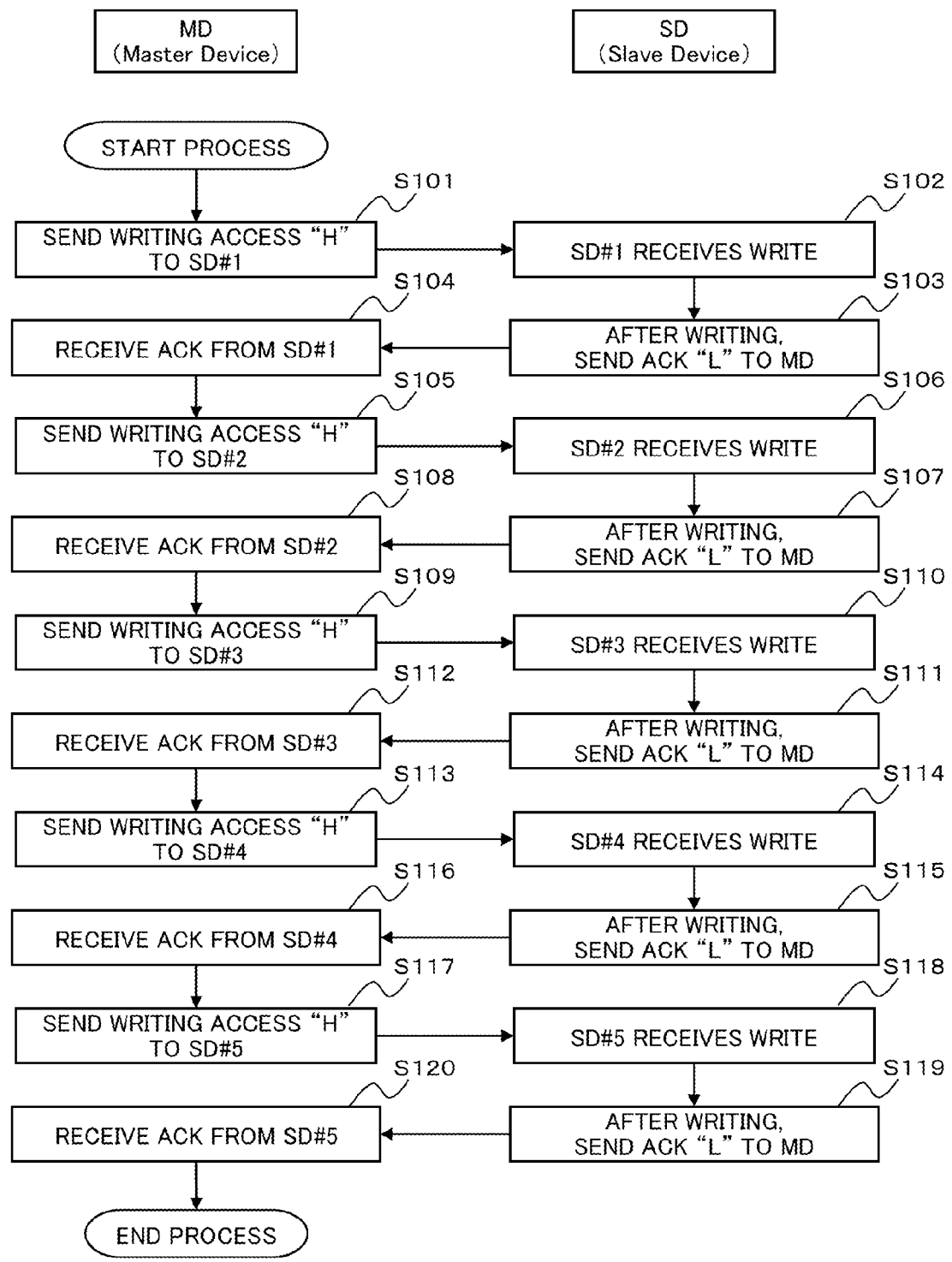
FIG. 18 is a flow diagram illustrating a procedure of a single master device being performing writing access to five slave devices.

For example, at the start of a server device, initial setting values are written into each SD 3 using the I2C in order to set the initial information into the respective units that constitute the server device. In this event, if the server device includes multiple same units, the same data is written into the multiple units. If the data writing is carried out serially (see FIG. 18), the start of the device takes a longer time in proportional to increase in the number of SDs 3.

In contrast to the above, the first embodiment can correctly accomplish simultaneous access to multiple devices without imparting the function of the normal I2C access. This can reduce the sequences of firmware of the same access procedure to be implemented in the individual SDs 3, so that the efficiency in the operation related to an access process can be enhanced. Adopting simultaneous access in place of serial access can greatly reduce the time for writing access. This can rapidly start the device as the shipping test and also as the practical use, so that time for testing can be shortened and speedy practical use can be achieved.

(2) Second Embodiment:

(2-1) Configuration of Second Embodiment:

Next, description will now be made in relation to a data forwarding system 1A including a bus controller 4A according to a second embodiment with reference to the block diagram FIG. 7. Hereinafter, like reference numbers designate the same or the substantially same elements and parts detailed above, so repetitious description is omitted here.

Figure 7:
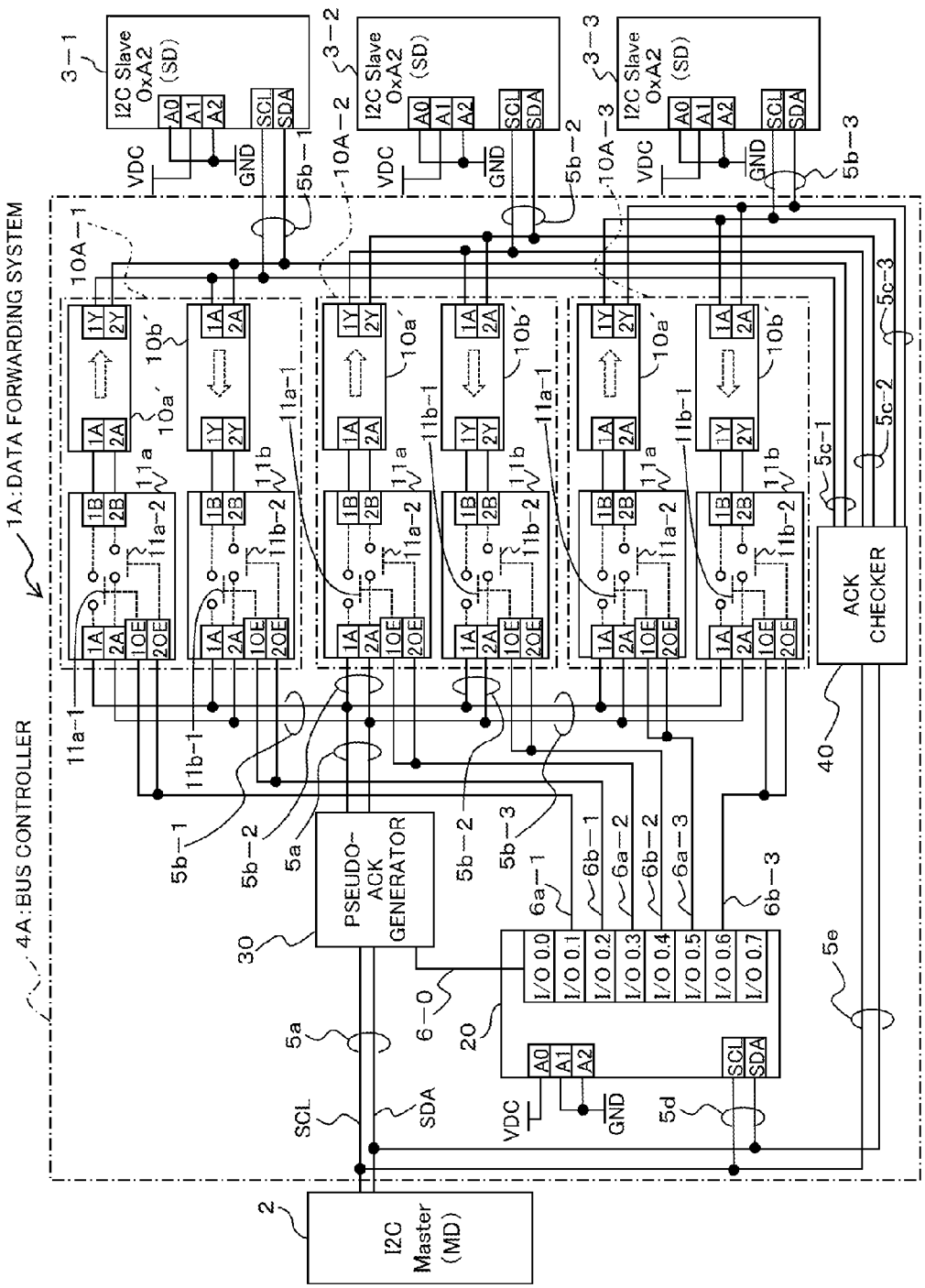
FIG. 7 is a block diagram schematically illustrating the configuration of a data forwarding system including a bus controller according to a second embodiment.

As illustrated in FIG. 7, the data forwarding system 1A of the second embodiment is different from that of the first embodiment in the point that the bus controller 4 included in the data forwarding system 1 of the first embodiment is substituted by the bus controller 4A. The bus controller 4A of the second embodiment is substantially similar in configuration to the bus controller 4 of the first embodiment, but as illustrated in FIG. 7, is different from the bus controller 4 in the point that the bus controller 4A includes the bidirectional buffers 10A-1, 10A-2, and 10A-3 in place of the bidirectional buffers 10-1, 10-2, and 10-3 of the first embodiment. Hereinafter, reference numbers 10A-1, 10A-2, and 10A-3 are used for specifying one of the three bidirectional buffer, but an arbitrary bidirectional buffer is represented by reference number 10A.

Hereinafter, the configuration of the bidirectional buffer 10A of the second embodiment will now be detailed. As illustrated in FIG. 7, each bidirectional buffer 10A includes a first buffer 10*a*' and a switch 11*a* in place of the first buffer (three-state buffer) 10*a* of the first embodiment. Likewise, each bidirectional buffer 10A includes a second buffer 10*b*' and a switch 11*b* in place of the second buffer (three-state buffer) 10*b* of the first embodiment.

The first buffer 10*a*' restricts the access direction and specifically permits data forwarding from the MD 2 to the corresponding SD 3. The first buffer 10*a*' includes an SCL input terminal 1A, an SDA input terminal 2A, an SCL output terminal 1Y, and an SDA output terminal 2Y. The SCL input terminal 1A and the SDA input terminal 2A of the first buffer 10*a*' are connected to a terminal 1B and 2B of the switch 11*a*, respectively. The SCL output terminal 1Y and the SDA output terminal 2Y of the buffer 10*a*' are connected to an SCL terminal SCL and an SDA terminal SDA of the corresponding SD 3 through the I2C bus 5*b*, respectively. As illustrated in FIG. 7, the SCL output terminal 1Y and the SDA output terminal 2Y of the first buffer 10*a*' are further connected to the ACK checker 40 through the I2C bus 5*c*.

The second buffer 10*b*' restricts the access direction and specifically permits data forwarding from the corresponding SD 3 to the MD 2. The second buffer 10*b*' includes an SCL input terminal 1A, an SDA input terminal 2A, an SCL output terminal 1Y, and an SDA output terminal 2Y. The SCL output terminal 1Y and the SDA output terminal 2Y of the second buffer 10*b*' are connected to a terminal 1B and 2B of the switch 11*b*, respectively. The SCL input terminal 1A and the SDA input terminal 2A of the second buffer 10*b*' are connected to an SCL terminal SCL and an SDA terminal SDA of the corresponding SD 3 through the I2C bus 5*b*, respectively. As illustrated in FIG. 7, the SCL input terminal 1A and the SDA input terminal 2A of the second buffer 10*b*' are further connected to the ACK checker 40 through the I2C bus 5*c*.

Each switch 11a connects and disconnects the first buffer 10a' to and from the I2C bus 5b such that forwarded object (i.e., an SCL signal and an SDA signal) input into the first buffer 10a' is connected or disconnected. The switch 11a includes terminals 1A, 2A, 1B, and 2B, and control input terminals 1OE and 2OE, and connection switches 11a-1 and 11a-2. The terminals 1A and 2A of the switch 11a are connected to the SCL signal line and the SDA signal line of the I2C bus 5a via the SCL signal line and the SDA signal line of the I2C bus 5b, respectively. The terminals 1B and 2B of the switch 11a are connected to the SCL input terminal 1A and the SDA input terminal 2A of the first buffers 10a', respectively. The symbol "OE" of the control input terminals 1OE and 2OE is an abbreviation for Output Enable.

The connection switch 11a-1 connects and disconnects the terminal 1A of the switch 11a to and from the terminal 1B in the same switch 11a. Specifically, the connection switch 11a-1 connects the terminal 1A to the terminal 1B of the switch 11a when a control signal input into the control input terminal 1OE is L (0, means enable) while disconnects the terminal 1A from the terminal 1B when the control signal input into the control input terminal 1OE is H (1, means disable). Likewise, the connection switch 11a-2 connects and disconnects the terminal 2A of the switch 11a to and from the terminal 2B in the same switch 11a. Specifically, the connection switch 11a-2 connects the terminal 2A to the terminal 2B of the switch 11a when a control signal input into the control input terminal 2OE is L (0, means enable) while disconnects the terminal 2A from the terminal 2B of the switch 11a when the control signal input into the control input terminal 2OE is H (1, means disable). The same control signal is input into both the control input terminals 1OE and 2OE. The connection switch 11a-1 and 11a-2 in the FIG. 7 are in the disconnecting state.

Each switch 11b connects and disconnects the second buffer 10b' to and from the I2C bus 5b such that the forwarded object (i.e., an SCL signal and an SDA signal) to be output from the second buffer 10b' is connected or disconnected. The switch 11b also includes terminals 1A, 2A, 1B, and 2B, and control input terminals 1OE and 2OE, and connection switch 11b-1 and 11b-2. The terminals 1A and 2A of the switch 11b are connected to the SCL signal line and the SDA signal line of the I2C bus 5a via the SCL signal line and the SDA signal line of the I2C bus 5b, respectively. The terminals 1B and 2B of the switch 11b are connected to the SCL output terminal 1Y and the SDA output terminal 2Y of the second buffers 10b', respectively.

The connection switch 11b-1 connects and disconnects the terminal 1A of the switch 11b to and from the terminal 1B in the same switch 11b. Specifically, the connection switch 11b-1 connects the terminal 1A to the terminal 1B of the switch 11b when a control signal input into the control input terminal 1OE is L (0, means enable) while disconnects the terminal 1A from the terminal 1B when the control signal input into the control input terminal 1OE is H (1, means disable). Likewise, the connection switch 11b-2 connects and disconnects the terminal 2A of the switch 11b to and from the terminal 2B in the same switch 11b. Specifically, the connection switch 11b-2 connects the terminal 2A to the terminal 2B of the switch 11b when a control signal input into the control input terminal 2OE is L (0, means enable) while disconnects the terminal 2A from the terminal 2B of the switch 11b when the control signal input into the control input terminal 2OE is H (1, means disable). The same control signal is input into both the control input terminals 1OE and 2OE. The connection switch 11b-1 and 11b-2 in the FIG. 7 are in the disconnecting state.

The switch controller 20 of the second embodiment includes eight control output terminals [I/O 0.0] through [I/O 0.7]. Among these terminals, seven control output terminals [I/O 0.0] through [I/O 0.6] are connected to the control signal lines 6-0, 6a-1, 6b-1, 6a-2, 6b-2, 6a-3, and 6b-3 described in the first embodiment, respectively, and the remaining control output line [I/O 0.7] is unused (see FIGS. 9, 12, and 15).

The control output terminal [I/O 0.0] is connected to the enable terminal (see FIG. 2) of the pseudo-ACK generating circuit 31 through the control signal line 6-0.

The control output terminal [I/O 0.1] is connected to the control input terminals 1OE and 2OE of the switch 11a of the bidirectional buffer 10A-1 through the control signal line 6a-1. The control output terminal [I/O 0.2] is connected to the control input terminals 1OE and 2OE of the switch 11b of the bidirectional buffer 10A-1 through the control signal line 6b-1.

The control output terminal [I/O 0.3] is connected to the control input terminals 1OE and 2OE of the switch 11a of the bidirectional buffer 10A-2 through the control signal line 6a-2. The control output terminal [I/O 0.4] is connected to the control input terminals 1OE and 2OE of the switch 11b of the bidirectional buffer 10A-2 through the control signal line 6b-2.

The control output terminal [I/O 0.5] is connected to the control input terminals 1OE and 2OE of the switch 11a of the bidirectional buffer 10A-3 through the control signal line 6a-3. The control output terminal [I/O 0.6] is connected to the control input terminals 1OE and 2OE of the switch 11b of the bidirectional buffer 10A-3 through the control signal line 6b-3.

The switch controller 20 switches control signals output from each of the respective control output terminal [I/O 0.0] to [I/O 0.6] between the enable state and the disable state to thereby switch the state of connecting or disconnecting of the switches 11a and 11b of the corresponding bidirectional buffers 10. Accordingly, likewise the bidirectional buffers 10 of the first embodiment, the first buffer 10a' and the second buffer 10b' of each bidirectional buffer 10A of the second embodiment are each switched between the data-forwarding enable state and the data-forwarding disable state.

The switch controller 20 also includes an SCL terminal SCL and a SDA terminal SDA likewise the SDs 3. The SCL terminal SCL and the SDA terminal SDA are connected to the MD 2 through the SCL signal lines and the SDA signal line of the I2C bus 5d, respectively. This allows the MD 2, through the I2C bus 5d, to switch the setting value of the control signal output from the switch controller 20 (i.e., between the enable state and the disable state). Besides, the SDs 3 and the switch controller 20 each has terminals A0, A1, and A2 through which electric power is supplied to the corresponding unit.

(2-2) Operation of Second Embodiment:

Next, description will now be made in relation to the operation of the bus controller 4A of the second embodiment having the above configuration and function by referring to FIGS. 8-16.

Figure 8:
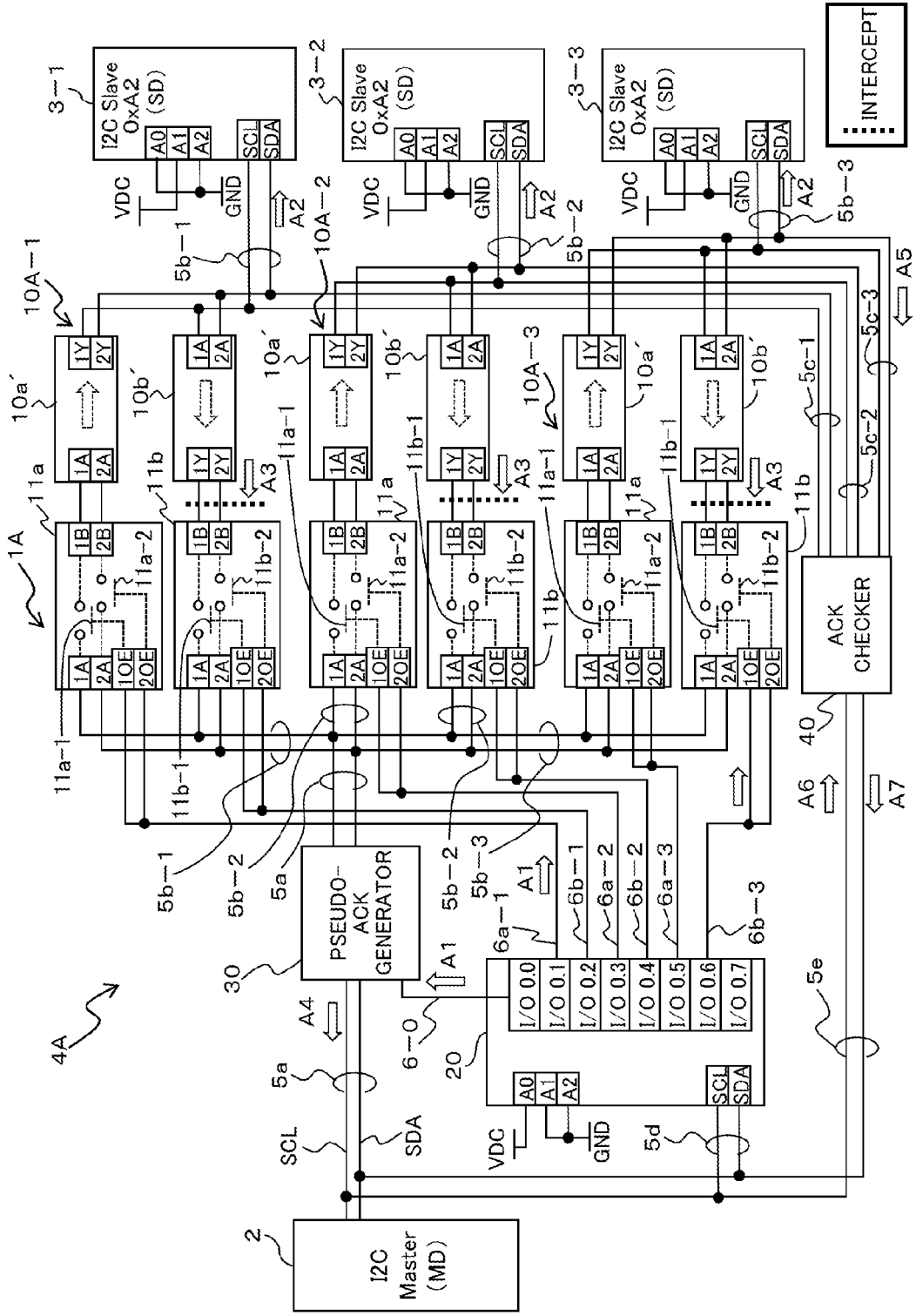
FIG. 8 is a diagram illustrating a state of simultaneous writing and simultaneous retrying by means of I2C multicasting of the second embodiment.

(2-2-1) Simultaneous Writing and Simultaneous Retrying:

First of all, description will now be made in relation to operation of simultaneous writing and simultaneous retrying using I2C multicasting of the second embodiment along the flow diagram (steps S11 and S16) of FIG. 10 by referring to FIGS. 8 and 9. FIG. 8 is a diagram illustrating operation of simultaneous writing and simultaneous retrying of the second embodiment. FIG. 9 is a table denoting operation of the switch controller 20 during simultaneous writing and simultaneous retrying, and specifically is a table in which setting values of control signals set by the switch controller 20 during the simultaneous writing and the simultaneous retrying are associated with buses to be concurrently activated. In FIG. 9, SD#1, SD#2, and SD#3 represent the SDs 3-1, 3-2, and 3-3 of FIGS. 7 and 8, respectively.

Figure 10:
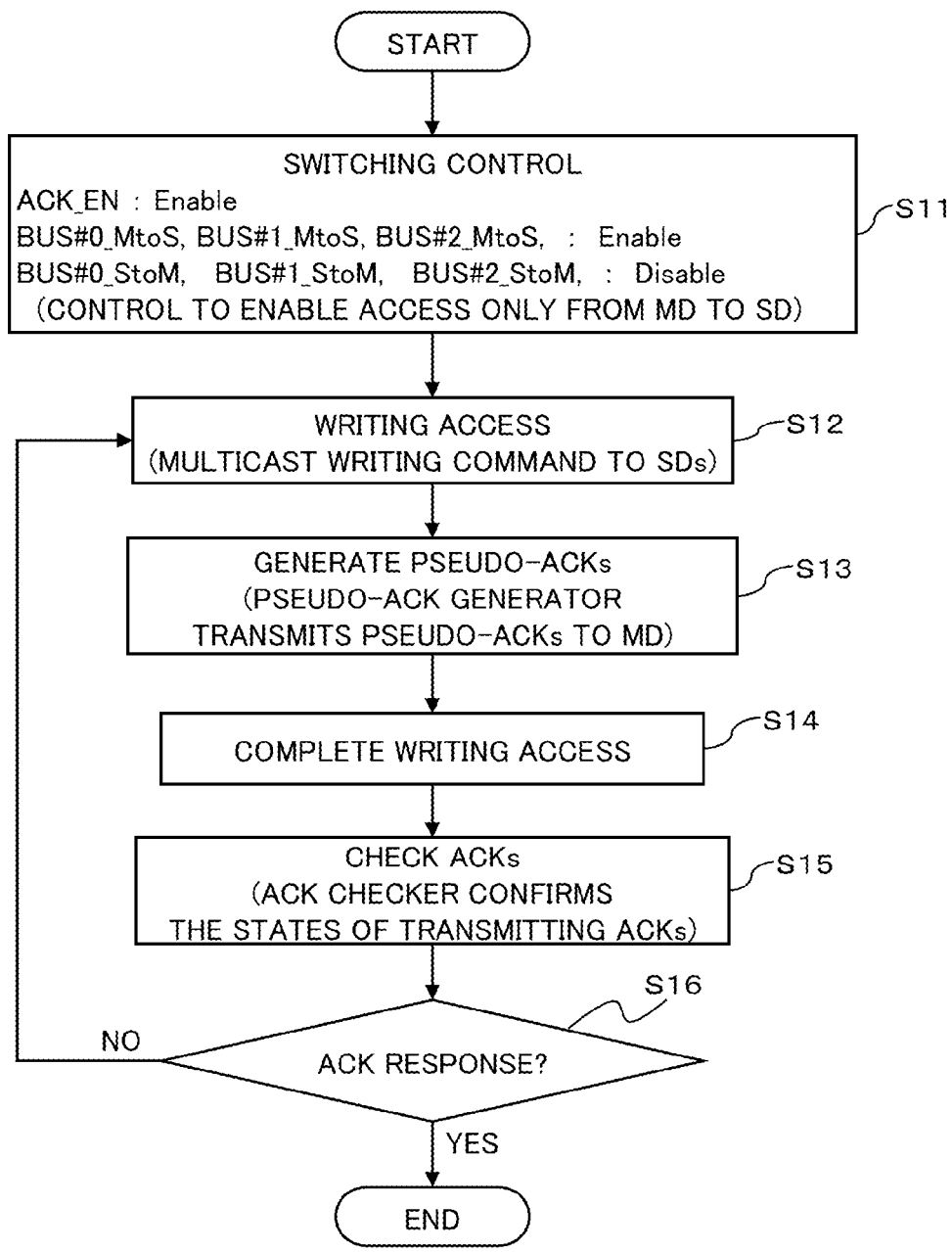
FIG. 10 is a flow diagram illustrating operation of simultaneous writing and simultaneous retrying of the second embodiment.

For simultaneous writing by means of the I2C multicasting, the switch controller 20 sets the values of control signals to be output from the control output terminals [I/O 0.0] through [I/O 0.6] to the respective control signal lines to the values as denoted in FIG. 9 (see Arrow A1 in FIG. 8 and step S11 of FIG. 10). Specifically, the switch controller 20 sets the control signal ACK_EN that is to be sent from the control output terminal [I/O 0.0] to the pseudo-ACK generator 30 to be "0" and thereby switches the function (ACK generation) of the pseudo-ACK generator 30 into the enable state. In addition, the switch controller 20 sets the control signals from the control output terminals [I/O 0.1], [I/O 0.3], and [I/O 0.5] to the control input terminals 1OE and 2OE of the switches 11a to be "0", so that the first buffers 10a' of the bidirectional buffers 10A are switched into the enable state corresponding to the data-forwarding enable state. Furthermore, the switch controller 20 sets the control signals from the control output terminals [I/O 0.2], [I/O 0.4], and [I/O 0.6] to the control input terminals 1OE and 2OE of the switches 11b into "1", so that the second buffers 10b' of the bidirectional buffers 10A are switched into the disable state corresponding to the data-forwarding disable state. This enables the MD 2 to forward data to the respective SDs 3, but conversely disables the respective SDs 3 to forward data to the MD 2.

Under the state where the values of the respective control signals are set as denoted in the table FIG. 9, the MD 2 carries out simultaneous writing process (i.e., issues a writing command) by using the I2C multicasting on the multiple SDs 3 set therefor the same address (e.g., 0xA2) (see Arrow A2 of FIG. 8 and step S12 of FIG. 10).

Each SD 3 responses to the writing command with a response signal (ACK/NACK). However, data forwarding from each SD 3 to the MD 2 is set to be in the disable state by the switch 11b and is intercepted, so that the response signal does not reach the MD 2 (see Arrow A3 and the thick dotted line in FIG. 8). At this time, the pseudo-ACK generator 30 generates a pseudo-ACK at timings of replying with the response signal described above with reference to FIG. 4A and transmits the generated pseudo-ACK to the MD 2 (see Arrow A4 in FIG. 8 and step S13 of FIG. 10). Upon receipt of the pseudo-ACK, the MD 2 completes the writing access (see step S14 of FIG. 10).

After that, the MD 2 refers to and checks the information that is retained in the pseudo-ACK generator (error flag register 43) and that represents whether access to each SD 3 has succeeded and failed (normality or abnormality of the access result) (see Arrows A6 and A7 of FIG. 8, and step S15 of FIG. 10). If the access results of all the SDs 3 are normal, that is, if all the SDs 3 replies with the ACKs (Yes route in step S16), the MD 2 completes the simultaneous writing. Here, the information related to success or failure in the access to each SD 3 is stored into the pseudo-ACK generator 30 (i.e., error flag register 43) at a timing of replying with the response signal described above with reference to FIG. 4A (see Arrow A5 of FIG. 8).

On the other hand, if the access result of any of the multiple SDs 3 is abnormal, which means that any one of the multiple SDs 3 replies with a NACK (NO route in step S16 of FIG. 10), the MD 2 returns to step S12 and carries out steps S12-S16 again, and thereby achieves simultaneous retrying. The simultaneous retrying is repeated until YES determination in step S16.

(2-2-2) Simultaneous Writing and Simultaneous Retrying

Figure 11:
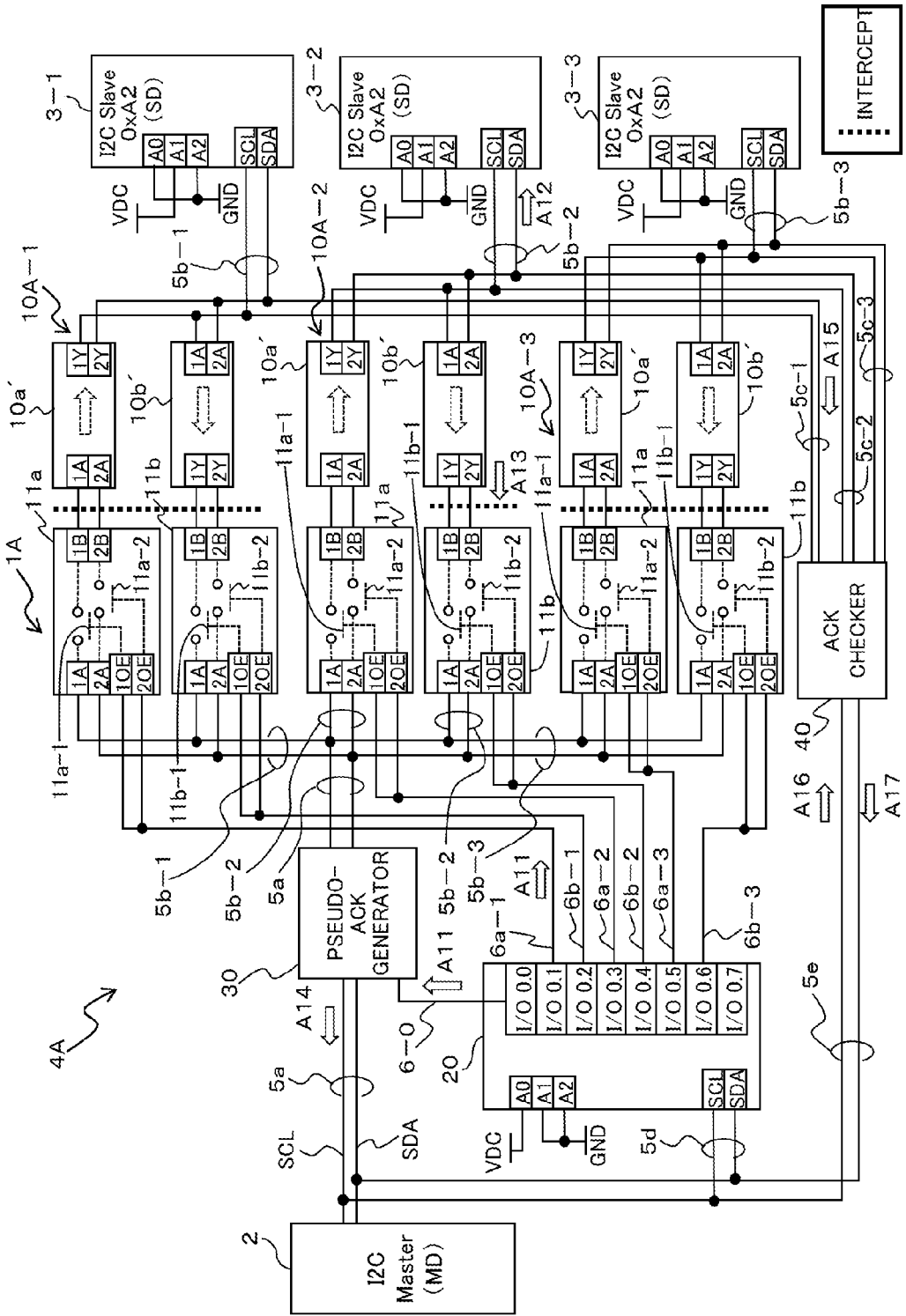
FIG. 11 is a diagram illustrating operation of simultaneous writing and individual retrying by I2C multicasting of the second embodiment.

Next, description will now be made in relation to simultaneous writing and simultaneous retrying using the I2C multicasting of the second embodiment along the flow diagram (steps S21-S28) of FIG. 13 by referring to FIGS. 11 and 12. FIG. 11 is a diagram illustrating simultaneous writing and simultaneous retrying; and FIG. 12 is a diagram illustrating operation of the switch controller 20 as individual retrying, and specifically is a table in which setting values of control signals set by the switch controller 20 as individual retrying are associated with buses to be activated. In FIG. 12, SD#1, SD#2, and SD#3 represent the SDs 3-1, 3-2, and 3-3 of FIGS. 7 and 8, respectively.

Here, the process of simultaneous writing using the I2C multicasting is performed along the procedure (see steps S21-S26 of FIG. 13) same as the above procedure (Arrows A1-A7 in FIG. 8 and steps S11-S16 in FIG. 10) described with reference to FIGS. 8-10.

Figure 13:
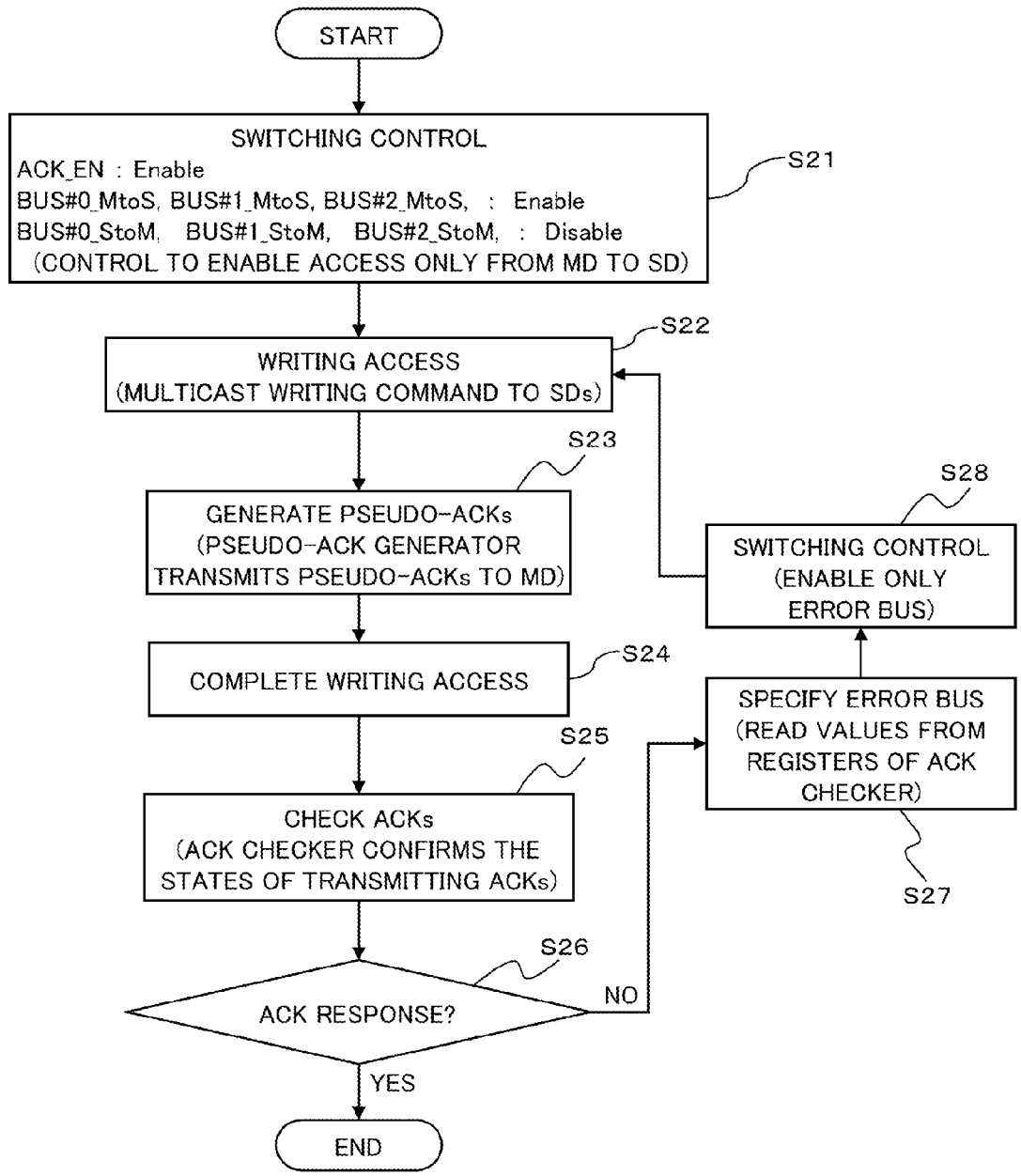
FIG. 13 is a flow diagram illustrating operation of simultaneous writing and individual retrying of the second embodiment.

If the access result of any of the multiple SDs 3 is abnormal, which means that any one of the multiple SDs 3 replies with a NACK (NO route in step S26 of FIG. 13), the MD 2 refers to the information in the ACK checker 40 to identify an error bus, i.e., the SD 3 having the abnormality (step S27 of FIG. 13).

After identifying the abnormal SD 3, the MD 2 controls the switch controller 20 such that individual writing using the I2C multicasting is to be carried out. The following description assumes that the abnormal SD 3 is the SD 3-2 (SD#2). In order to switch data forwarding from the MD 2 only to the SD#2 (i.e., the error bus) into the enable state, the switch controller 20 set the values of the control signals to be output from the control output terminals [I/O 0.0] through [I/O 0.6] to the respective control signal lines as denoted in FIG. 12 (see Arrow A11 in FIG. 11 and step S28 of FIG. 13).

Specifically, the switch controller 20 sets the control signal ACK_EN from the control output terminal [I/O 0.0] to the pseudo-ACK generator 30 to be "0" and thereby switches the function (ACK generation) of the pseudo-ACK generator 30 is switched into the enable state. In addition, the switch controller 20 sets the control signals from the control output terminal [I/O 0.3] to the control input terminals 1OE and 2OE of the switch 11a in the bidirectional buffers 10A-2 to be "0" in order to switch the first buffer 10a' of the bidirectional buffer 10A-2 into the enable state corresponding to the data-forwarding enable state. The switch controller 20 further sets the control signals from the control output terminals [I/O 0.1], [I/O 0.2], [I/O 0.4], [I/O 0.5], and [I/O 0.6] to the control input terminals 1OE and 2OE of the switches 11a and 11b of the first buffers 10a' and the second buffers 10b' of the remaining bidirectional buffers 10A to be "1" in order to switch the remaining first buffers 10a' and the second buffers 10b' into the disable state corresponding to the data-forwarding disable state. Thereby, only data forwarding from the MD 2 to the SD#2 comes into the enable state while the remaining data forwarding comes into the disable state.

Under a state where the values of the control signals are set as denoted in FIG. 12, the MD 2 executes simultaneous writing (issues a writing command) using the I2C multicasting on the particular SD#2 for which the identical address (e.g., 0xA2) as the remaining SDs 3 is set. Since only data forwarding from the MD 2 to the SD#2 is in the enable state, execution of the simultaneous writing forwards the writing command only to the SD#2, so that the individual writing is carried out on the SD#2 (see Arrow A12 of FIG. 11, and steps S22 of FIG. 13).

The SD#2 replies to the MD 2 with a response signal (ACK/NACK) in response to the writing command. However, since data forwarding from the is in the disable state, the response signal is SD#2 to the MD 2 intercepted and does not reach the MD 2 (see Arrow A13 and the thick dotted line in FIG. 11). At that time, the pseudo-ACK generator 30 generates a pseudo-ACK at the reply timings of the response signal described above by referring to FIGS. 4A and 4B and transmits the generated pseudo-ACK to the MD 2 (see Arrow A14 in FIG. 11 and step S23 of FIG. 13). Upon receipt of the pseudo-ACK, the MD 2 completes the writing access (retrying access) (see step S24 of FIG. 13).

After that, the MD 2 refers to and checks, through the I2C bus 5e, the information (the access result being normal/abnormal) as to whether the access to the SD#2 has been succeeded or failed, which information is stored in the ACK checker 40 (error flag register 43) (see Arrows A16 and A17 in FIG. 11 and step S25 of FIG. 13). If the access result of the SD#2 is normal, which means that the SD#2 replies with an ACK (YES route in step S26), the MD 2 completes the simultaneous writing and the individual retrying. The information as to whether the access to the SD#2 has been succeeded or failed is stored into the ACK checker 40 (the error flag register 43) at the reply timings described above by referring to FIGS. 4A and 4B (see Arrow A15 of FIG. 11).

In contrast, the access result of the SD#2 even after the individual retrying is still abnormal, which means that the SD#2 replies with a NACK (NO route in step S26 of FIG. 13), the MD 2 carries out steps S27, S28 and S22-S26 again. In this manner, the individual retrying is repeated until step S26 results in the YES determination. The second individual retrying can omit the process of steps S27 and S28 because the failure SD 3 has already been identified.

Figure 14:
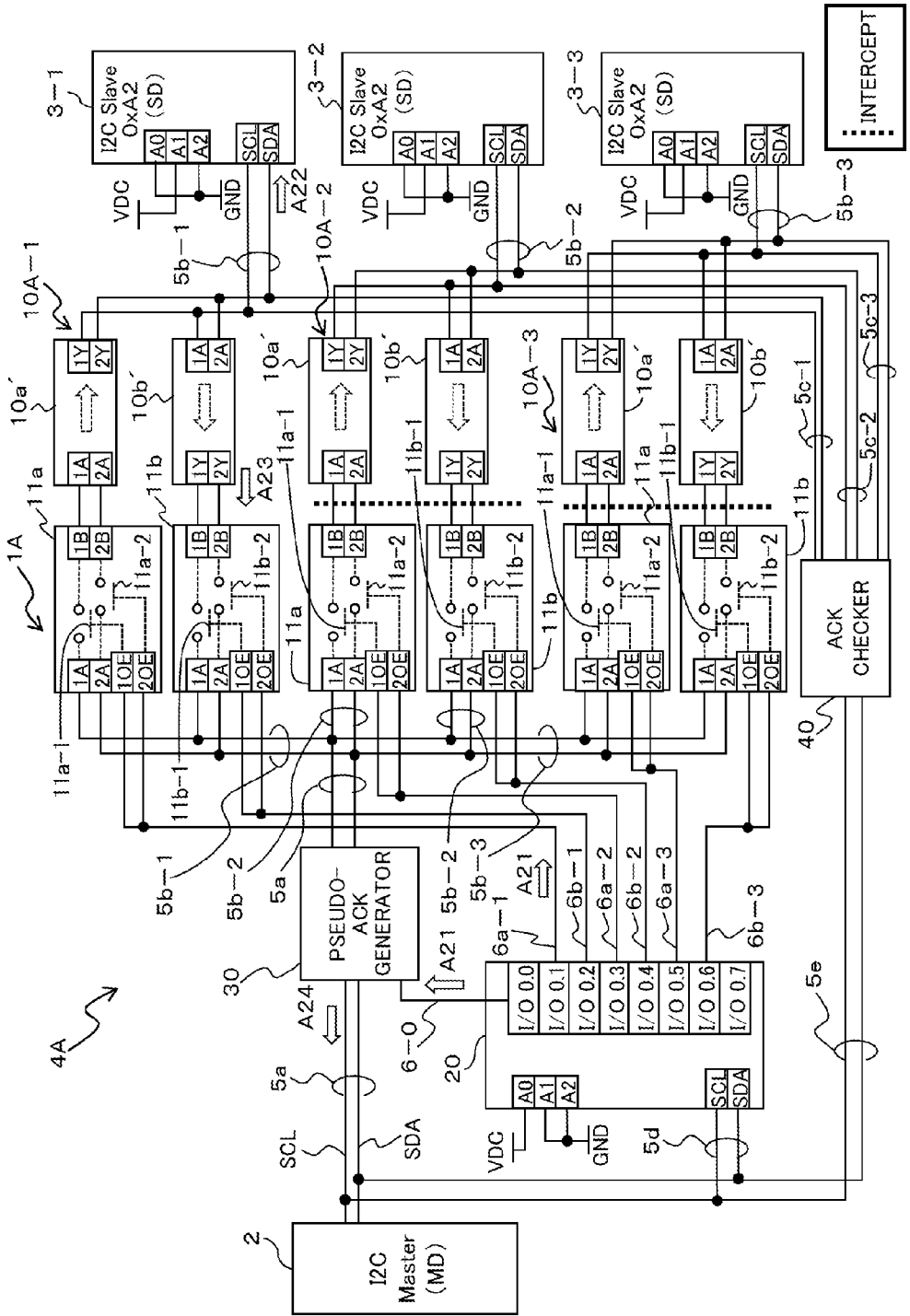
FIG. 14 is a diagram illustrating an operation of individual reading by I2C multicasting of the second embodiment.
Figure 17A:
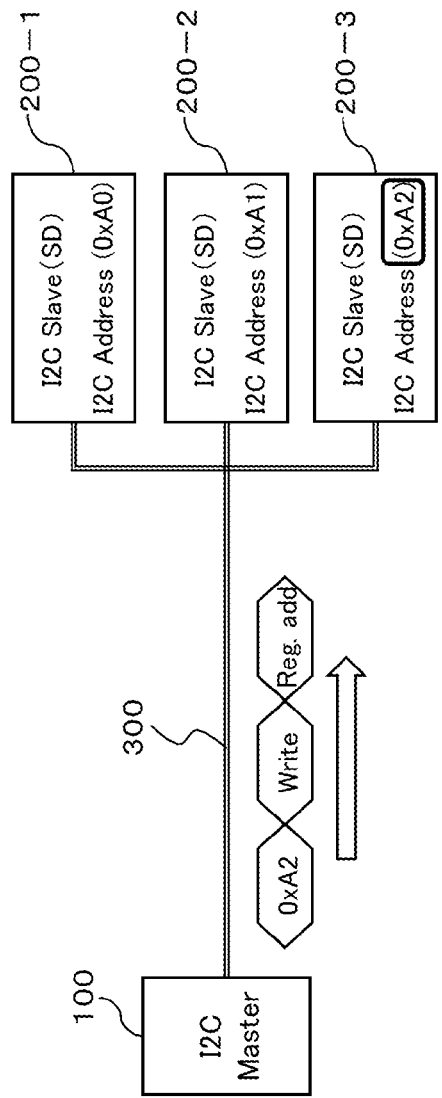
FIGS. 17A and 17B are diagrams illustrating a typical I2C tree configuration and a typical I2C communication procedure.
Figure 17B:
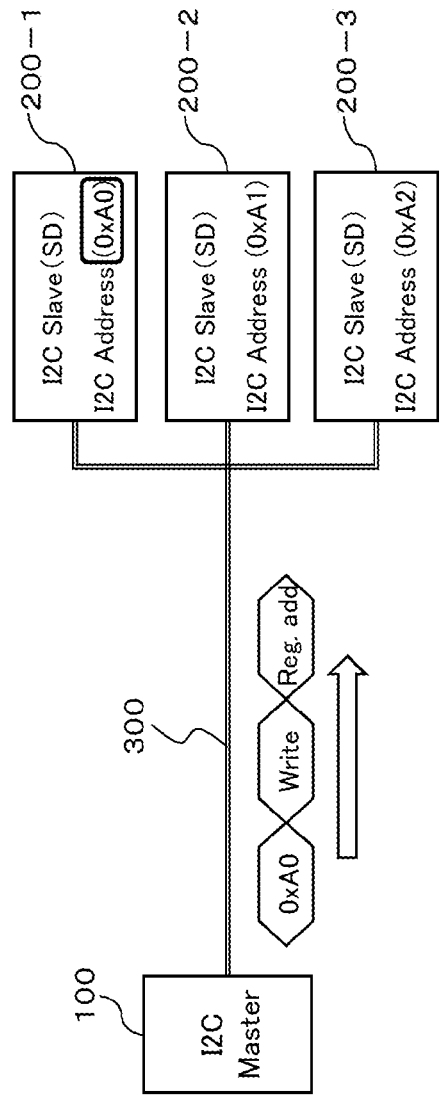

(2-2-3) Individual Reading:

Next, description will now be made in relation to individual reading by means of the I2C multicasting of the second embodiment by referring to FIGS. 14 and 15. FIG. 14 illustrates individual reading and FIG. 15 illustrates operation of the switch controller 20 when individual reading of the second embodiment is being carried out and specifically is a table in which setting values set by the switch controller 20 as individual reading are associated with buses to be activated. In FIG. 15, SD#1, SD#2, and SD#3 correspond to the SDs 3-1, 3-2, and 3-3 of FIGS. 7 and 8, respectively.

When the MD 2 is to read setting values of a particular SD 3, the switch controller 20 intends executing of individual reading through the I2C multicasting and sets the values of the control signals to be output from the output control terminals [I/O 0.0] through [I/O 0.6] to the respective control signal lines as denoted in FIG. 15 (see Arrow A21 in FIG. 14 and step S31 of FIG. 16). The following description assumes that the particular SD 3 to be read data therefrom is the SD 3-1 (SD#1).

For this purpose, the switch controller 20 sets a control signal ACK_EN to be output from the control output terminal [I/O 0.0] to the pseudo-ACK generator 30 to be "1", so that the pseudo-ACK generator 30 is switched into a state of passing the signal transmitting through the I2C bus 5a without processing (Pass through).

The switch controller 20 switches the first buffer 10a' and the second buffer 10b' on the bus 5b-1 corresponding to the reading target SD#1 into the enable state, so that the buffers 10a' and 10b' are switched into the data-forwarding enable state. For this switching, the switch controller 20 sets the control signals from the control output terminals [I/O 0.1] and [I/O 0.2] into the control input terminals 1OE and 2OE of the switches 11a and 11b of the bidirectional buffer 10A-1, respectively, to be "0".

In contrast, the switch controller 20 switches the buffers 10a' and 10b' of the bidirectional buffers 10A-2 and 10A-3 into the disable state corresponding to the data-forwarding disable state. For this switching, the switch controller 20 sets the control signals from the control output terminals [I/O 0.3] through [I/O 0.6] into the control input terminals 1OE and 2OE of the switches 11a and 11b, respectively, to be "1".

Thereby, the data forwarding only between the MD 2 and the reading target SD#1 is enabled, but data forwarding between the MD 2 and the SD#2 and that between the MD 2 and the SD#3 are disabled.

Under the state where the values of control signals are set as denoted in FIG. 15, the MD 2 issues a reading command to the multiple SDs 3 having the same I2C address (e.g., 0xA2) set therein by means of the I2C multicasting. At this time, since only the data forwarding from the MD 2 to the SD#1 is in the enable state, a reading command reaches only the SD#1 even if the reading command is simultaneously transmitted to all the SD#1-SD#3, so that the individual reading access is carried out on SD#1 (see Arrow A22 of FIG. 14 and step S32 of FIG. 16).

After data designated by the MD 2 is read from the SD#1, the read data is forwarded to the MD 2 because data forwarding from the SD#1 to the MD 2 is in the enable state. At that time, since the pseudo-ACK generator 30 is in the disable state corresponding to the pass-through state, the read data merely passes through the pseudo-ACK generator 30 and reaches the MD 2 via the I2C bus 5a (see Arrows A23 and S24 in FIG. 14 and step S33 of FIG. 16).

After that, if the reading access by the MD 2 is completed (YES route of step S34 in FIG. 16), the MD 2 completes the reading access. In contrast, if the reading access by the MD 2 is not completed yet (No route of step S34 in FIG. 16), the MD 2 returns step S32 and repeats steps S32-S34 until the reading access is completed.

(2-3) Effects of Second Embodiment

As described above, the bus controller 4A of the second embodiment ensures the same advantageous effects as those of the first embodiment.

(3) Others:

Preferred embodiments of the present invention are detailed as above, but the present invention should by no means be limited to the foregoing first and second embodiments. Various changes and modifications can be suggested without departing from the spirit of the present invention.

For example, the first and second embodiment assume that three slave devices (SDs) are included. Alternatively, the number of slave devices may be two, four or more, which can be applied likewise to the foregoing embodiments and can obtain the same advantageous results as those of the foregoing embodiments.

The above first and second embodiment assume that the data forwarding system of the present invention is applied to a server device, to which the present invention is not limited. Alternatively, the data forwarding system of the present invention may be applied to any apparatus having multiple identical devices therein, which apparatus is exemplified by a data processor, a controlling system for a television receiver, and an image forming apparatus that deals with large volume of image data. The present invention can be applied to these alternative apparatuses, from which the same advantageous result as those of the foregoing embodiments can be obtained.

According to the embodiments, simultaneous access to multiple device can be achieved.

All examples and conditional language provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A bus controller for controlling a plurality of buses each forwarding data between a first device and one of a plurality of second devices, the bus controller comprising:
    a first buffer and a second buffer being disposed on each of the plurality of buses, the first buffer forwarding data from the first device to the corresponding second device through the bus, the second buffer forwarding data from the corresponding second device to the first device through the bus;
    a switch controller that, in response to a simultaneous data transmission request to simultaneously transmit data from the first device to the plurality of second devices, switches the first buffer into a data-forwarding enable state that allows data transmission from the first device to the corresponding second device, and switches the second buffer into a data-forwarding disable state that prohibits data transmission from the corresponding second device to the first device, for simultaneous data transmission from the first device to the plurality of the second devices; and
    a pseudo-response generator that generates a plurality of pseudo-response signals acting as a plurality of response signals that the plurality of second devices transmit to the first device as a result of the simultaneous data transmission, and transmits the plurality of the pseudo-response signals to the first device,
    the switch controller switches the pseudo-response generator between the data-forwarding enable state and the data-forwarding disable state; and
    the pseudo-response generator replies the pseudo-response signal to the first device when the pseudo-response generator is switched into the data-forwarding enable state, and data is forwarded from the second device to the first device when the pseudo-response generator is switched into the data-forwarding disable state.

2. The bus controller according to claim 1, further comprising:
    a storing section that receives the plurality of response signals from the plurality of second devices and stores respective states of the plurality of response signals therein; and
    a reply controller that, in response to a state reply request from the first device, reads the states of the plurality of response signals from the storing section and transmits the read states to the first device.

3. The bus controller according to claim 2, wherein, in response to a retransmission request issued when at least one of the states indicates abnormality, the switch controller switches the first buffer into the data-forwarding enable state, switches the second buffer into the data forwarding disable state, and causes the first device to retry the simultaneous data transmission.

4. The bus controller according to claim 2, wherein, in response to a retransmission request issued when at least one of the states indicates abnormality, the switch controller specifies a second device corresponding to the abnormality among the plurality of second devices, switches only the first buffer corresponding to the specified second device into the data-forwarding enable state, and causes the first device to retry the simultaneous data transmission.

5. The bus controller according to claim 1, wherein, in response to a reading request of reading data from a particular second device among the plurality of second devices, the switch controller switches the first buffer and the second buffer that correspond to the particular second device into the data-forwarding enable states and causes the first device to read the data from the particular second device.

6. The bus controller according to claim 1, wherein:
    the first buffer and the second buffer are three-state buffers; and
    the switch controller switches each of the three-state buffers between the data-forwarding enable state and the data forwarding disable state by switching a control signal to be input into a control input terminal of the three-state buffer.

7. The bus controller according to claim 1, further comprising switches that are provided one for each of the first buffer and the second buffer and that connect or disconnect output or input of data to be forwarded from or into the respective corresponding buffers, wherein
    the switch controller switches each of the first buffer and the second buffer between the data-forwarding enable state and the data-forwarding disable state by switching the corresponding switch between a connecting state and a disconnecting state.

8. The bus controller according to claim 1, wherein
    the plurality of buses are serial-interface buses;
    an identical address is set for the plurality of the second devices; and
    the first device carries out the simultaneous data transmission to the plurality of second devices using the identical address.

9. A data forwarding system comprising:
    a first device;
    a plurality of second devices; and
    a bus controller that controls a plurality of buses each forwarding data between the first device and one of the plurality of second devices, the bus controller comprising:
        a first buffer and a second buffer being disposed on each of the plurality of buses, the first buffer forwarding data from the first device to the corresponding second device through the bus, the second buffer forwarding data from the corresponding second device to the first device through the bus;
        a switch controller that, in response to a simultaneous data transmission request to simultaneously transmit data from the first device to the plurality of second devices, and switches the first buffer into a data-forwarding enable state that allows data transmission from the first device to the corresponding second device, switches the second buffer into a data-forwarding disable state that prohibits data transmission from the corresponding second device to the first device, for simultaneous data transmission from the first device to the plurality of the second devices; and a pseudo-response generator that generates a plurality of pseudo-response signals acting as a plurality of response signals that the plurality of second devices transmit to the first device as a result of the simultaneous data transmission, and transmits the plurality of the pseudo-response signals to the first device, the switch controller switches the pseudo-response generator between the data-forwarding enable state and the data-forwarding disable state; and the pseudo-response generator replies the pseudo-response signal to the first device when the pseudo-response generator is switched into the data-forwarding enable state, and data is forwarded from the second device to the first device when the pseudo-response generator is switched into the data-forwarding disable state.

10. The data forwarding system according to claim 9, the bus controller further comprising:

a storing section that receives the plurality of response signals from the plurality of second devices and stores respective states of the plurality of response signals therein; and a reply controller that, in response to a state reply request from the first device, reads the states of the plurality of response signals from the storing section and transmits the read states to the first device.

11. The data forwarding system according to claim 10, wherein, in response to a retransmission request issued when at least one of the states indicates abnormality, the switch controller switches the first buffer into the data-forwarding enable state, switches the second buffer into the data forwarding disable state, and causes the first device to retry the simultaneous data transmission.

12. The data forwarding system according to claim 10, wherein, in response to a retransmission request issued when at least one of the states indicates abnormality, the switch controller specifies a second device corresponding to the abnormality among the plurality of second devices, switches only the first buffer corresponding to the specified second device into the data-forwarding enable state, and causes the first device to retry the simultaneous data transmission.

13. The data forwarding system according to claim 9, wherein, in response to a reading request of reading data from a particular second device among the plurality of second devices, the switch controller switches the first buffer and the second buffer that correspond to the particular second device into the data-forwarding enable states and causes the first device to read the data from the particular second device.

14. The data forwarding system according to claim 9, wherein:

the first buffer and the second buffer are three-state buffers; and the switch controller switches each of the three-state buffers between the data-forwarding enable state and the data forwarding disable state by switching a control signal to be input into a control input terminal of the three-state buffer.

15. The data forwarding system according to claim 9, the bus controller further comprising switches that are provided one for each of the first buffer and the second buffer and that connect or disconnect output or input of data to be forwarded from or into the respective corresponding buffers, wherein the switch controller switches each of the first buffer and the second buffer between the data-forwarding enable state and the data-forwarding disable state by switching the corresponding switch between a connecting state and a disconnecting state.

16. The data forwarding system according to claim 9, wherein the plurality of buses are serial-interface buses;

an identical address is set for the plurality of the second devices; and the first device carries out the simultaneous data transmission to the plurality of second devices using the identical address.

17. A method of controlling a plurality of buses each forwarding data between a first device and one of a plurality of second devices in a data forwarding system comprising a first buffer and a second buffer being disposed on each of the plurality of buses, the first buffer forwarding data from the first device to the corresponding second device through the bus, the second buffer forwarding data from the corresponding second device to the first device through the bus, the method comprising:

in response to a simultaneous data transmission request to simultaneously transmit data from the first device to the plurality of second devices, switching the first buffer into a data-forwarding enable state that allows data transmission from the first device to the corresponding second device, and switching the second buffer into a data-forwarding disable state that prohibits data transmission from the corresponding second device to the first device, for simultaneous data transmission from the first device to the plurality of the second devices;

generating a plurality of pseudo-response signals acting as a plurality of response signals that the plurality of second devices transmit to the first device as a result of the simultaneous data transmission;

transmitting the plurality of the pseudo-response signals to the first device in a pseudo-response generator;

switching the pseudo-response generator between the data-forwarding enable state and the data-forwarding disable state; and replying the pseudo-response signal to the first device when the pseudo-response generator is switched into the data-forwarding enable state, and forwarding data from the second device to the first device when the pseudo-response generator is switched into the data-forwarding disable state.

18. The method according to claim 17, further comprising:

receiving the plurality of response signals from the plurality of second devices and storing respective states of the plurality of response signals; and in response to a state reply request from the first device, reading the states of the plurality of stored response signals and transmitting the read states to the first device.

19. The method according to claim 18, further comprising:

in response to a retransmission request issued when at least one of the states indicates abnormality, switching the first buffer into the data-forwarding enable state;

switching the second buffer into the data forwarding disable state; and causing the first device to retry the simultaneous data transmission.

20. The method according to claim 18, further comprising:
 in response to a retransmission request issued when at least one of the states indicates abnormality,
 specifying a second device corresponding to the abnormality among the plurality of second devices;
 switching only the first buffer corresponding to the specified second device into the data-forwarding enable state; and
 causing the first device to retry the simultaneous data transmission.

\* \* \* \* \*